(12) United States Patent
Moldoveanu et al.

(10) Patent No.: US 11,503,853 B2
(45) Date of Patent: Nov. 22, 2022

(54) SMOKELESS TOBACCO COMPOSITION INCORPORATING A BOTANICAL MATERIAL

(71) Applicant: R.J. Reynolds Tobacco Company, Winston-Salem, NC (US)

(72) Inventors: Serban C. Moldoveanu, Winston-Salem, NC (US); Jerry Wayne Marshall, Stokesdale, NC (US); Wayne Allen Scott, Lewisville, NC (US); Dwayne William Beeson, Kernersville, NC (US); Daniel Verdin Cantrell, Lewisville, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 246 days.

(21) Appl. No.: 14/072,318

(22) Filed: Nov. 5, 2013

(65) Prior Publication Data

US 2015/0068545 A1 Mar. 12, 2015

Related U.S. Application Data

(63) Continuation-in-part of application No. 14/021,409, filed on Sep. 9, 2013.

(51) Int. Cl.
| | | |
|---|---|---|
| *A24B 13/00* | (2006.01) | |
| *A24B 15/16* | (2020.01) | |
| *A23G 3/48* | (2006.01) | |

(52) U.S. Cl.
CPC .............. *A24B 13/00* (2013.01); *A24B 15/16* (2013.01); *A23G 3/48* (2013.01)

(58) Field of Classification Search
CPC ............ A24B 13/00; A24B 15/16; A23G 3/48
(Continued)

(56) References Cited

U.S. PATENT DOCUMENTS

| | | |
|---|---|---|
| 1,376,586 A | 5/1921 | Schwartz |
| 2,930,720 A | 3/1960 | Finberg |
| (Continued) | | |

FOREIGN PATENT DOCUMENTS

| | | |
|---|---|---|
| CN | 1465299 | 1/2004 |
| CN | 101884430 | 11/2010 |
| (Continued) | | |

OTHER PUBLICATIONS

Green Tea Extract, "Brunswick Laboratories—Database for ORAC 5.0 and Cellular Antioxidant Assay (CAA)", http://www.brunswicklabs.com/tech-library/orac-database/green-tea-extract, printed from the Internet on Aug. 1, 2015.*

(Continued)

*Primary Examiner* — Dionne W. Mayes
(74) *Attorney, Agent, or Firm* — Womble Bond Dickinson (US) LLP

(57) ABSTRACT

A smokeless tobacco product configured for insertion into the mouth of a user of the product is provided, the smokeless tobacco product including a dissolvable or meltable base composition admixed with a tobacco material and a botanical material, wherein the botanical material is present in an amount of at least about 0.1% of the total dry weight of the smokeless tobacco product. The botanical material and the smokeless tobacco product can be characterized based on antioxidant content using the ORAC index or the FRAP index. An exemplary product has an ORAC index value of at least about 20 (μmol TE)/g or a FRAP index value of at least about 50 (μmol/Fe$^{2+}$)/g.

20 Claims, 1 Drawing Sheet

(58) Field of Classification Search
USPC .......................................................... 131/352
See application file for complete search history.

(56) References Cited

U.S. PATENT DOCUMENTS

| | | | |
|---|---|---|---|
| 3,067,068 A | 12/1962 | Finberg | |
| 3,696,917 A | 10/1972 | Levi | |
| 3,806,617 A | 4/1974 | Smylie et al. | |
| 4,513,756 A | 4/1985 | Pittman et al. | |
| 4,528,993 A | 7/1985 | Sensabaugh, Jr. et al. | |
| 4,607,479 A | 8/1986 | Linden | |
| 4,624,269 A | 11/1986 | Story et al. | |
| 4,631,899 A | 12/1986 | Nielsen | |
| 4,696,315 A | 9/1987 | Summers | |
| 4,725,440 A | 2/1988 | Ridgway et al. | |
| 4,967,773 A | 11/1990 | Shaw | |
| 4,987,907 A | 1/1991 | Townend | |
| 4,991,599 A | 2/1991 | Tibbetts | |
| 5,092,352 A | 3/1992 | Sprinkle, III et al. | |
| 5,167,244 A | 12/1992 | Kjerstad | |
| 5,346,734 A | 9/1994 | Wydick, Jr. | |
| 5,387,416 A | 2/1995 | White et al. | |
| 5,549,906 A * | 8/1996 | Santus ................. | A61K 9/0056 424/434 |
| 5,733,574 A | 3/1998 | Dam | |
| 6,077,524 A | 6/2000 | Bolder et al. | |
| 6,138,683 A | 10/2000 | Hersh et al. | |
| 6,146,638 A * | 11/2000 | Kakimoto et al. ... | A61K 36/062 424/195.15 |
| 6,162,516 A | 12/2000 | Derr | |
| 6,248,760 B1 | 6/2001 | Wilhelmsen | |
| 6,280,761 B1 | 8/2001 | Santus | |
| 6,668,839 B2 | 12/2003 | Williams | |
| 6,676,959 B1 | 1/2004 | Andersson et al. | |
| 6,834,654 B2 | 12/2004 | Williams | |
| 6,845,777 B2 * | 1/2005 | Pera ........................ | A23G 3/36 131/270 |
| 6,887,307 B1 | 5/2005 | Scott et al. | |
| 6,923,981 B2 | 8/2005 | Leung et al. | |
| 6,953,040 B2 | 10/2005 | Atchley et al. | |
| 7,032,601 B2 | 4/2006 | Atchley et al. | |
| 7,374,779 B2 | 5/2008 | Chen et al. | |
| 7,694,686 B2 | 4/2010 | Atchley et al. | |
| 7,819,124 B2 | 10/2010 | Strickland et al. | |
| 7,861,728 B2 | 1/2011 | Holton, Jr. et al. | |
| 7,946,295 B2 | 5/2011 | Brinkley et al. | |
| 8,067,046 B2 | 11/2011 | Schleef et al. | |
| 8,168,855 B2 | 5/2012 | Neilsen et al. | |
| 8,434,496 B2 | 5/2013 | Chen | |
| 2001/0016593 A1 | 8/2001 | Wilhelmsen | |
| 2004/0020503 A1 | 2/2004 | Williams | |
| 2004/0101543 A1 | 5/2004 | Liu | |
| 2004/0118422 A1 | 6/2004 | Lundin et al. | |
| 2005/0061339 A1 | 3/2005 | Hansson et al. | |
| 2005/0115580 A1 | 6/2005 | Quinter et al. | |
| 2005/0244521 A1 | 11/2005 | Strickland et al. | |
| 2006/0120974 A1 | 6/2006 | McNeight | |
| 2006/0191548 A1 | 8/2006 | Strickland et al. | |
| 2006/0198873 A1 | 9/2006 | Chan et al. | |
| 2007/0062549 A1 * | 3/2007 | Holton et al. .............. | 131/352 |
| 2008/0020050 A1 | 1/2008 | Chau et al. | |
| 2008/0029110 A1 * | 2/2008 | Dube et al. ............. | A24B 13/00 131/275 |
| 2008/0029116 A1 | 2/2008 | Robinson et al. | |
| 2008/0173317 A1 | 7/2008 | Robinson et al. | |
| 2008/0196730 A1 | 8/2008 | Engstrom et al. | |
| 2008/0305216 A1 | 12/2008 | Crawford et al. | |
| 2009/0065013 A1 | 3/2009 | Essen et al. | |
| 2009/0081291 A1 | 3/2009 | Gin et al. | |
| 2009/0293889 A1 | 12/2009 | Kumar et al. | |
| 2009/0293895 A1 | 12/2009 | Axelsson et al. | |
| 2010/0004294 A1 | 1/2010 | Axelsson et al. | |
| 2010/0018883 A1 | 1/2010 | Patel | |
| 2010/0061940 A1 | 3/2010 | Axelsson et al. | |
| 2010/0218779 A1 | 9/2010 | Zhuang et al. | |
| 2010/0260690 A1 | 10/2010 | Kristensen et al. | |
| 2010/0291245 A1 | 11/2010 | Gao et al. | |
| 2011/0061666 A1 | 3/2011 | Dube et al. | |
| 2011/0139164 A1 | 6/2011 | Mua et al. | |
| 2011/0214681 A1 | 9/2011 | Axelsson et al. | |
| 2011/0236442 A1 | 9/2011 | Miser et al. | |
| 2011/0247640 A1 | 10/2011 | Beeson et al. | |
| 2011/0315154 A1 | 12/2011 | Mua et al. | |
| 2012/0031415 A1 | 2/2012 | Essen et al. | |
| 2012/0037175 A1 | 2/2012 | Cantrell et al. | |
| 2012/0055494 A1 | 3/2012 | Hunt et al. | |
| 2012/0138073 A1 | 6/2012 | Cantrell et al. | |
| 2012/0138074 A1 | 6/2012 | Cantrell et al. | |
| 2012/0167904 A1 | 7/2012 | Morrow | |
| 2012/0272976 A1 | 11/2012 | Byrd et al. | |
| 2013/0074855 A1 | 3/2013 | Holton, Jr. | |
| 2013/0074856 A1 | 3/2013 | Holton, Jr. | |
| 2013/0118512 A1 | 5/2013 | Jackson et al. | |
| 2013/0146073 A1 * | 6/2013 | Li et al. ........................ | 131/310 |
| 2013/0152953 A1 | 6/2013 | Mua et al. | |
| 2013/0206150 A1 | 8/2013 | Duggins et al. | |
| 2013/0206153 A1 | 8/2013 | Beeson et al. | |
| 2013/0274296 A1 | 10/2013 | Jackson et al. | |

FOREIGN PATENT DOCUMENTS

| | | |
|---|---|---|
| EP | 1 304 048 | 4/2003 |
| EP | 2818059 | 12/2014 |
| WO | WO 99/39595 | 8/1999 |
| WO | WO 2004/095959 | 12/2004 |
| WO | WO 2005/041699 | 5/2005 |
| WO | WO 2007/03 7962 | 4/2007 |
| WO | WO 2009/010884 | 1/2009 |
| WO | WO 2009/015142 | 1/2009 |
| WO | WO 2009/05 6611 | 5/2009 |
| WO | WO 2010/132444 | 11/2010 |
| WO | WO 2012/019025 | 2/2012 |
| WO | WO 2012/021504 | 2/2012 |

OTHER PUBLICATIONS

Carlsen, et al, "Ginkgo Biloba Supplements", Nutrition Journal NIH Jan. 2010, printed from the Internet on Jul. 8, 2021. (Year: 2010).*
Anand et al., "Curcumin and Cancer: An "old-age" Disease With an "age-old" Solution," *Cancer Letters*, 2008, vol. 267, pp. 133-164. www.curcuminesearch.org/.
Benzie et al., "The Ferric Reducing Ability of Plasma (FRAP) as a Measure of "Antioxidant Power": The FRAP Assay," *Analytical Biochemistry*, 1996, pp. 70-76, vol. 239.
Bureenok et al., "Additive Effects of Green Tea on Fermented Juice of Epiphytic Lactic Acid Bacteria (FJLB) and the Fermentative Quality of rhodesgrass Silage," *Asian-Aust. J. anim. Sci.*, 2007, vol. 20, No. 6, pp. 920-924. www.ajas.info/Edito/manuscript/upload/20-129.pdf.
Cerella et al. "Natural Compounds as Regulators of the Cancer Cell Metabolism," *International Journal of Cell Biology*, vol. 2013 (2013), Article ID 639401, 16 pages, http://www.hindawi.com/journals/ijcb/2013/639401/.
Clark et al., "Curcumin Inhibits Carcinogen and Nicotine-Induced Mammalian Target of Rapamycin Pathway Activation in Head and Neck Squamous Cell Carcinoma," *Cancer Prevention Research*, 2010, vol. 3(12), pp. 1586-1595. http://cancerpreventionresearch.aacrjournals.org/content/3/12/1586.short.
Dalzell, LFRA Ingredients Handbook, Sweeteners, Leatherhead Food RA, Dec. 1996, pp. 21-44, http://firatozel.files.wordpress.com/2011/08/essential_guide_to_food_additives.pdf.
Khafif et al., "Quantitation of Chemopreventive Synergism Between (-)-epigallocatech in-3-gallate and curcumin in normal, premalignant and Malignant Human Oral Epithelial Cells," *Carcinogenesis*, 1998, pp. 419-424, vol. 19, No. 3. http://carcin.oxfordjournals.org/content/19/3/419.
Kokotkiewicz et al., "Honeybush (*Cyclopia* sp.)—A rich Source of Compounds with High Antimutagenic Properties," *Fitoterapia*, 2009, pp. 3-11, vol. 80.

(56) References Cited

OTHER PUBLICATIONS

Kokotkiewicz et al., "In Vitro cultures of *Cyclopia* Plants (Honeybush) as a Source of Bioactive Xanthones and Flavanones," *Z. Naturforsch*, 2009, pp. 533-540, www.znaturforseh.com/rc/s64c0533.pdf.

Lu et al., "Enzymatic Tannase Treatment of Green Tea Increases in vitro Inhibitory Activity Against N-nitrosation of Dimethylamine," *Process Biochemistry*, 2007, pp. 1285-1290, vol. 42.

Ou et al., "Development and Validation of an Improved Oxygen Radical Absorbance Capacity Assay Using Fluorescein as the Fluorescent Probe," *J. Agric. Food Chem.* 2001, pp. 4619-4626, vol. 49.

Ou et al., "Novel Fluorometric Assay for Hydroxyl Radical Prevention Capacity Using Fluorescein as the Probe," *J. Agric. Food Chem.*, 2002, pp. 2772-2777, vol. 50.

Puangsombat et al., "Inhibitory Activity of Asian Spices on Heterocyclic Amines Formation in Cooked Beef Paties," *J. Food Science*, Oct. 2011, vol. 76, No. 8., http://www.ncbi.nlm.nih.gov/pubmed/21913920.

Rinaldi et al., "Curcumin Activates the Aryl Hydrocarbon Receptor Yet Significantly Inhibits (-)-Benzo(a)pyrene-7R-trans-7,8-dihydrodiol Bioactivation in Oral Squamous Cell Carcinoma Cells and Oral Mucosa," *Cancer Research*, 2002; 62:5451-5456, http://cancerres.aacrjournals.org/content/62/19/5451.long.

Santhosh et al., "Potent Suppressive Effect of Green Tea Polyphenols on Tobacco-Induced Mutagenicity," *Phytomedicine*, 2005, pp. 216-220, vol. 12.

South African Rooibos Council, "The Science Behind Rooibos—South Africa's Unique and Healthy Herbal Tea," *Rooibos Research*, Jul. 2013, pp. 1-6, www.sarooibos.co.za/images/the-science-behind-rooibos-july2013.pdf.

"Opinion of the Scientific Panel on Food Additives, Flavourings, Processing Aids and Materials in Contact with Food on a request from the Commission related to . . . " The EFSA Journal, 2004, pp. 1-32, vol. 85.

Gadow, et al., Comparison of the Antioxidant Activity Rooibos Tea (*Aspalathus linearis*) With Green, Oolong and Black Tea, *Food Chemistry*, 1997, pp. 73-77, vol. 60, No. 1.

Filip et al. "Antioxidant Activity of Ilex Paraguariensis and Related Species," *Nutrition Research*, 2000, pp. 1437-1446, vol. 20, No. 10.

Joubert et al., "Effect of Species Variation and Processing on Phenolic Composition and in Vitro Antioxidant Activity of Aqueous Extracts of *Cyclopia* spp. (Honeybush Tea)," *Journal of Agricultural and Food Chemistry*, 2008, pp. 954-963, vol. 56, No. 3.

Selected works of Chen Zongmao, Chinese Academy of Agricultural Sciences Tea, China Tea Science Society, China Agricultural Science and Technology Press, Oct. 31, 2004, pp. 770-771.

* cited by examiner

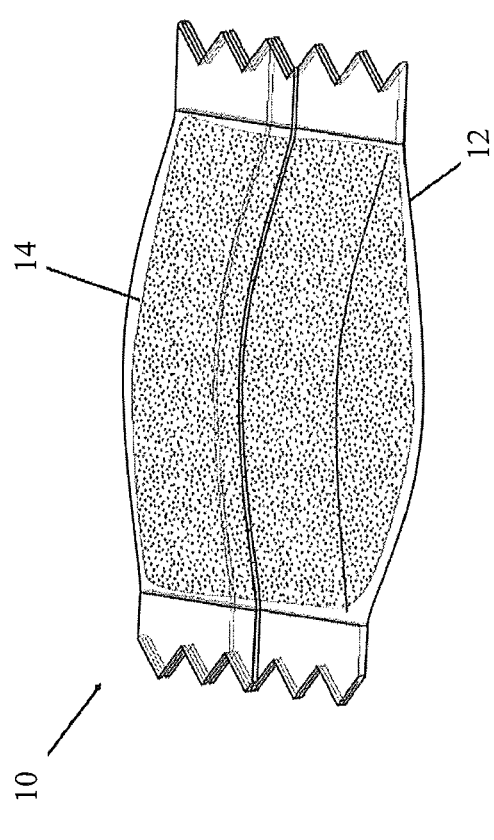
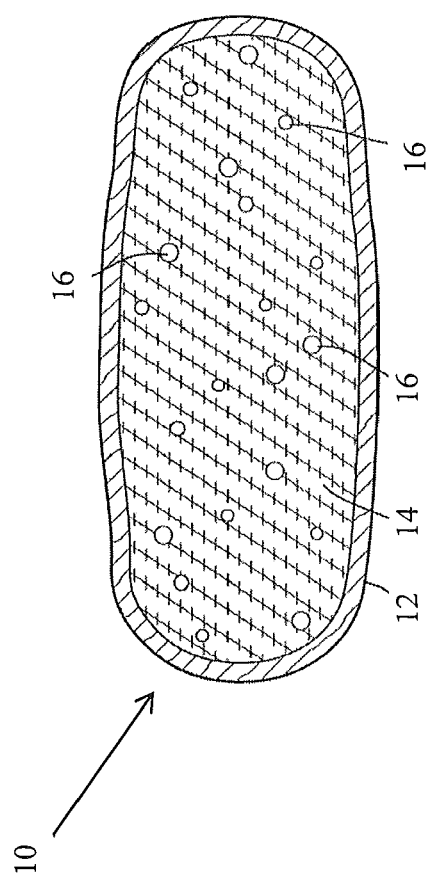

SMOKELESS TOBACCO COMPOSITION INCORPORATING A BOTANICAL MATERIAL

CROSS-REFERENCE TO RELATED APPLICATIONS

This application is a continuation-in-part of U.S. application Ser. No. 14/021,409, filed Sep. 9, 2013, which is incorporated by reference herein in its entirety.

FIELD OF THE INVENTION

The present invention relates to products made or derived from tobacco, or that otherwise incorporate tobacco, and are intended for human consumption.

BACKGROUND OF THE INVENTION

Cigarettes, cigars and pipes are popular smoking articles that employ tobacco in various forms. Such smoking articles are used by heating or burning tobacco, and aerosol (e.g., smoke) is inhaled by the smoker. Tobacco also may be enjoyed in a so-called "smokeless" form. Particularly popular smokeless tobacco products are employed by inserting some form of processed tobacco or tobacco-containing formulation into the mouth of the user.

See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0173317 to Robinson et al.; 2008/0196730 to Engstrom et al.; 2008/0209586 to Neilsen et al.; 2008/0305216 to Crawford et al.; 2009/0065013 to Essen et al.; 2009/0293889 to Kumar et al.; 2010/0291245 to Gao et al; and 2011/0139164 to Mua et al.; PCT WO 04/095959 to Arnarp et al. and WO 2010/132444 A2 to Atchley, each of which is incorporated herein by reference. Exemplary smokeless tobacco products that have been marketed include those referred to as CAMEL Snus, CAMEL Orbs, CAMEL Strips and CAMEL Sticks by R. J. Reynolds Tobacco Company; GRIZZLY moist tobacco, KODIAK moist tobacco, LEVI GARRETT loose tobacco and TAYLOR'S PRIDE loose tobacco by American Snuff Company, LLC; KAYAK moist snuff and CHATTANOOGA CHEW chewing tobacco by Swisher International, Inc.; REDMAN chewing tobacco by Pinkerton Tobacco Co. LP; COPENHAGEN moist tobacco, COPENHAGEN Pouches, SKOAL Bandits, SKOAL Pouches, RED SEAL long cut and REVEL Mint Tobacco Packs by U.S. Smokeless Tobacco Company; and MARLBORO Snus and Taboka by Philip Morris USA.

Through the years, various treatment methods and additives have been proposed for altering the overall character or nature of tobacco materials utilized in tobacco compositions. For example, additives or treatment processes are sometimes utilized in order to alter the chemistry or sensory properties of the tobacco material, or in the case of smokable tobacco materials, to alter the chemistry or sensory properties of mainstream smoke generated by smoking articles including the tobacco material.

It would be desirable in the art to provide compositions that alter the character and nature of tobacco (and tobacco compositions and formulations) useful in smoking articles or smokeless tobacco products.

SUMMARY OF THE INVENTION

The present invention relates to a smokeless tobacco product comprising a tobacco material and a separate botanical component. The addition of a botanical material to a smokeless tobacco product can offer numerous advantages such as enhancement of antioxidant character, altered sensory characteristics, and possible addition of health or medicinal benefits. Although the focus of the application is on smokeless tobacco products, the tobacco/botanical compositions set forth herein could also be incorporated into smoking articles, such as cigarettes or electronic cigarettes.

In various embodiments of the present invention, a smokeless tobacco product configured for insertion into the mouth of a user of the product is provided, the smokeless tobacco product comprising a tobacco material mixed with at least one botanical material, wherein the botanical material comprises at least about 0.1% of the total dry weight of the smokeless tobacco product. The tobacco formulation can be contained within a water-permeable pouch, for example.

In various embodiments of the smokeless tobacco product described herein, the botanical material can have an ORAC index value of about 250 ($\mu$mol TE)/g or greater, about 500 ($\mu$mol TE)/g or greater, or about 1000 ($\mu$mol TE)/g or greater. In some embodiments, the botanical material can have a FRAP index value of about 250 ($\mu$mol/Fe$^{2+}$)/g or greater, or about 500 ($\mu$mol/Fe$^{2+}$)/g or greater, or about 1000 ($\mu$mol/Fe$^{2+}$)/g or greater.

The smokeless tobacco product can also be characterized by ORAC index value or FRAP index value, and those values will vary depending on the type and structure of the smokeless tobacco product, the type and amount of tobacco in the product, and the type and amount of additional botanical material in the product. In various embodiments of the smokeless tobacco product described herein, particularly snus-type products, the smokeless tobacco product can have an ORAC index value of at least about 50 ($\mu$mol TE)/g or a FRAP index value of at least about 80 ($\mu$mol/Fe$^{2+}$)/g. In some embodiments, the smokeless tobacco product can have an ORAC index value of at least about 75 ($\mu$mol TE)/g or a FRAP index value of at least about 100 ($\mu$mol/Fe$^{2+}$)/g.

Various types of botanical materials can be included in a smokeless tobacco product. For example, the botanical material can be selected from the group consisting of rosemary, oregano, sage, hibiscus, clove, rose hip, yerba mate, cocoa, turmeric, guayusa, honeybush, green tea, black tea, rooibos, yerba santa, bacopa monniera, ginkgo biloba, withania somnifera, and combinations thereof. In some embodiments, a smokeless tobacco product can incorporate honeybush, rooibos, yerba mate or a combination thereof. In some embodiments of a smokeless tobacco product the botanical material is a tea or a tisane material. In addition, botanical materials can be provided in various forms. In various embodiments, both the tobacco material and the botanical material can be in particulate form. In some embodiments of a smokeless tobacco material, at least one of the tobacco material and the botanical material are in the form of an oil or aqueous extract or an ethanol or other alcohol extract. In various embodiments, the tobacco material is a tobacco-derived nicotine solution.

In various embodiments of a smokeless tobacco product, the botanical material can comprise at least about 1%, or at least about 5% of the total dry weight of the smokeless tobacco product. A larger amount of botanical material can be used to achieve a higher antioxidant character of the product. In certain embodiments where a botanical extract is used, the botanical material can comprise about 1% or less, or about 0.5% or less of the total dry weight of the smokeless tobacco product. In one embodiment, the botanical material is either (i) a shredded or particulate botanical material present in an amount of at least about 1% of the total dry weight (or at least about 5%) of the smokeless tobacco product; or (ii) a botanical material extract present in any amount of at least about 0.1% of the total dry weight (or at least about 0.5%) of the smokeless tobacco product.

Various embodiments of a smokeless tobacco product can further comprise one or more additional components selected from the group consisting of flavorants, binders, pH adjusters, buffering agents, salts, sweeteners, colorants, disintegration aids, other antioxidants, humectants, and preservatives.

In an embodiment of a smokeless tobacco product described herein, the product can be in the form of a snus product contained within a water-permeable pouch and can comprise at least about 50% of a pasteurized and fermented particulate tobacco material, based on the total dry weight of the smokeless tobacco product, and the botanical material can be in particulate form. Furthermore, the botanical material can be selected from the group consisting of rosemary, oregano, sage, hibiscus, clove, rose hip, yerba mate, cocoa, turmeric, guayusa, honeybush, green tea, black tea, rooibos, and combinations thereof. In certain embodiments, the snus product can have an ORAC index value of at least about 50 TE)/g or a FRAP index value of at least about 80 ($\mu$mol/$Fe^{2+}$)/g.

In certain embodiments, the smokeless tobacco product includes one or more of green tea, guayusa, rooibos, or honeybush in an amount sufficient to impart certain desirable sensory characteristics to the product. Exemplary amounts include green tea, guayusa, rooibos, or honeybush present as an aqueous extract in an amount of about 1 to about 5 dry weight percent, or in the form of a powder in an amount of about 5 to about 10 dry weight percent.

In various embodiments, a smokeless tobacco product configured for insertion into the mouth of a user of the product is provided, the smokeless tobacco product comprising a dissolvable or meltable base composition admixed with a tobacco material and a botanical material, wherein the botanical material is present in an amount of at least about 0.1% of the total dry weight of the smokeless tobacco product. Furthermore, the botanical material can be selected from the group consisting of rosemary, oregano, sage, hibiscus, clove, rose hip, yerba mate, cocoa, turmeric, guayusa, honeybush, green tea, black tea, rooibos, yerba santa, bacopa monniera, ginkgo biloba, withania somnifera, and combinations thereof. The smokeless tobacco product comprising a dissolvable or meltable base can also be characterized by ORAC index value or FRAP index value, and such values are lower than snus products in certain embodiments because less total botanical material is typically present in such products. Exemplary smokeless tobacco products of this type can have an ORAC index value of at least about 20 ($\mu$mol TE)/g or a FRAP index value of at least about 50 ($\mu$mol/$Fe^{2+}$)/g. In some embodiments, the smokeless tobacco products of this type can have an ORAC index value of at least about 50 ($\mu$mol TE)/g or a FRAP index value of at least about 80 ($\mu$mol/$Fe^{2+}$)/g.

In certain embodiments of a smokeless tobacco product, the smokeless tobacco product can include a botanical material selected from the group consisting of honeybush, rooibos, yerba mate and combinations thereof. In some embodiments, at least a portion of the botanical material can be provided in the form of a residual of an evaporated botanical juice. In various embodiments, the botanical juice can be fermented.

In various embodiments, a smokeless tobacco product can comprise a base composition, wherein the base composition is a dissolvable lozenge formulation comprising a sugar alcohol in an amount of at least about 80% by weight. In some embodiments, the sugar alcohol of the dissolvable lozenge formulation comprises isomalt, and the base composition further comprises maltitol.

In various embodiments, a smokeless tobacco product can comprise a base composition, wherein the base composition is a meltable formulation comprising a lipid having a melting point of about 36° C. to about 45° C. In some embodiments, the base composition can comprise the lipid in an amount of about 30% by weight or greater, and a filler in an amount of about 30% by weight or greater. In some embodiments, the filler can be a sugar alcohol. Furthermore, in certain embodiments, the sugar alcohol can be isomalt.

In various embodiments, the smokeless tobacco product can be in the form of a pastille comprising either a polysaccharide filler or a sugar alcohol in combination with a natural gum binder component. In some embodiments, the polysaccharide filler can comprise polydextrose. In some embodiments, the polysaccharide filler component of the pastille can be present in an amount of from about 10 weight percent to about 25 weight percent of the pastille formulation on a dry weight basis. In various embodiments, the pastille can comprise at least about 20 dry weight percent of a sugar alcohol, and at least about 25 dry weight percent of a natural gum binder component. The pastille can comprise isomalt in combination with gum arabic in some embodiments.

BRIEF DESCRIPTION OF THE DRAWINGS

In order to provide an understanding of embodiments of the invention, reference is made to the appended drawings, which are not necessarily drawn to scale, and in which reference numerals refer to components of described exemplary embodiments of the invention. The drawings are exemplary only, and should not be construed as limiting the invention.

FIG. 1 is a top view of a smokeless tobacco product embodiment, taken across the width of the product, showing an outer pouch filled with a combination of a tobacco material and a botanical material; and FIG. 2 is a cross-sectional view of a smokeless tobacco product embodiment, taken across the width of the product, showing an outer pouch filled with a combination of a tobacco material and a botanical material and optional microcapsules disposed therein.

DETAILED DESCRIPTION OF THE PREFERRED EMBODIMENTS

The present inventions now will be described more fully hereinafter with reference to the accompanying drawing.

The inventions may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The invention provides a tobacco composition incorporating a separate botanical material (e.g., leaf or extract), smokeless tobacco products incorporating such tobacco compositions, and methods for preparing a tobacco composition that includes a botanical material and for incorporating such compositions within smokeless tobacco products. The addition of a botanical material to a smokeless tobacco product can offer numerous advantages that will vary with selection of the specific botanical material and the nature and type of the smokeless tobacco product. Exemplary advantages include enhancement of antioxidant character of the smokeless tobacco product, altered sensory characteristics of the smokeless tobacco product, and possible addition of health or medicinal benefits associated with the smokeless tobacco product. In certain embodiments of the invention including a component derived or isolated from a botanical or herbal source, the botanical or herbal component can add advantageous biological functions to the product, such as immune system boosting effects, antioxidant effects, and the like. See, e.g., U.S. Pat. No. 4,696,315 to Summers; U.S. App. Pub. Nos. 2011/0061666 to Dube et al. and 2012/0272976 to Byrd et al., each of which is herein incorporated by reference.

As used herein, the term "botanical material" refers to any plant material, including plant material in its natural form and plant material derived from natural plant materials, such as extracts or isolates from plant materials or treated plant materials (e.g., plant materials subjected to heat treatment, fermentation, or other treatment processes capable of altering the chemical nature of the material). For the purposes of the present disclosure, a "botanical material" includes but is not limited to "herbal materials," which refer to seed-producing plants that do not develop persistent woody tissue and are often valued for their medicinal or sensory characteristics (e.g., teas or tisanes). Reference to botanical material is not intended to include tobacco materials (i.e., does not include any *Nicotiana* species). The botanical materials used in the present invention may comprise, without limitation, any of the compounds and sources set forth herein, including mixtures thereof. Certain botanical materials of this type are sometimes referred to as dietary supplements, nutraceuticals, "phytochemicals" or "functional foods."

Exemplary botanical materials, many of which are associated with antioxidant characteristics, include without limitation acai berry, alfalfa, allspice, annatto seed, apricot oil, basil, bee balm, wild bergamot, black pepper, blueberries, borage seed oil, bugleweed, cacao, calamus root, catnip, catuaba, cayenne pepper, chaga mushroom, chervil, cinnamon, dark chocolate, potato peel, grape seed, ginseng, ginkgo biloba, Saint John's Wort, saw palmetto, green tea, black tea, black cohosh, cayenne, chamomile, cloves, cocoa powder, cranberry, dandelion, grapefruit, honeybush, echinacea, garlic, evening primrose, feverfew, ginger, goldenseal, hawthorn, hibiscus flower, jiaogulan, kava, lavender, licorice, marjoram, milk thistle, mints (menthe), oolong tea, beet root, orange, oregano, papaya, pennyroyal, peppermint, red clover, rooibos (red or green), rosehip, rosemary, sage, clary sage, savory, spearmint, spirulina, slippery elm bark, sorghum bran hi-tannin, sorghum grain hi-tannin, sumac bran, comfrey leaf and root, goji berries, gutu kola, thyme, turmeric, uva ursi, valerian, wild yam root, wintergreen, yacon root, yellow dock, yerba mate, yerba santa, bacopa monniera, withania somnifera, and silybum marianum.

Botanical materials often include compounds from various classes known to provide certain bioactive effects, such as minerals, vitamins such a ascorbic acid, isoflavones, phytoesterols, allyl sulfides, dithiolthiones, isothiocyanates, indoles, lignans, flavonoids, polyphenols, plant phenolics, tocopherols, ubiquinone, benzodioxoles, carotenoids, etc. More specifically, typical antioxidants from botanicals can be classified in the following groups: monoterpenoid phenols; alcohols such as thymol, carvacol, menthol; p-cymene; diterpene phenols such as carnosic acid, carnosol, rosmanol; hydroxycinnamic type compounds such as caffeic acid, chlorogenic acid, rosmarinic acid, p-coumaric acid, resveratrol, curcumin, eugenol, cinnamaladehyde; hydroxybenzoic acids and derivatives such as gallic acid, protocatechuic acid, propyl gallate; 2-benzopryrones such as scopoletin, coumarin; 4-benzopyrones such as quercetin, genistein, naringenin, diosmin, rutin; dihydrochalcones such as aspalathin, notophagin; flavanols such as epicatechin, epigallocatechin, epicatechin gallate, epigallocatechin gallate; anthocyanins and anthocyanidins; triterpenes such as ursolic acid, oleanolic acid, betulinic acid, betulonic acid; tocopherols such as $\alpha$, $\beta$, $\gamma$, $\delta$-tocopherols; tocotrienols; carotenoids such as $\beta$-carotene or lutein; ubiquinone, CoQ10; ascorbyl palmitate; benzodioxoles such as myristicin, piperine, safrole; and other compounds such as gambogic acid, gingerol, and the like. Beyond antioxidant properties, certain compounds noted above can also have properties such as distinctive flavor, color, antiseptic properties, anti-carcinogenic effects, etc.

Exemplary compounds found in botanical materials include, but are not limited to, propylene glycol, lactic acid, glycolic acid, alanine, camphor, pyruvic acid, aspalathin, borneol, menthol, phosphate, glycerin, proline, succinic acid, thymol, glyceric acid, 2-butenedioic acid, 3-hydroxyglutaric acid, malic acid, 5-oxoproline (pyroglutamic acid), aspartic acid, trihydroxybutanoic acid, glutamine, asparagine, levoglucosan, xylitol, ribitol, 2-keto-L-gluconic acid, fructose, caffeine, citric acid, glucosamine, neophytadiene, altrose, quinic acid, xylulose, glucose, inositol, 2-amino-2-deoxyglucose, glucitol, ascorbic acid, glucose, gallic acid, gluconic acid, galactaric acid, hexadecanoic acid, 3,4-dihydroxyphenyl-2-hydroxypropionic acid, glucuronic acid, myoinositol, caffeic acid, tryptophan, linolenic acid, octadecanoic acid, galacturonic acid, rosmaricin, carnosic acid, melibiose, carnosol, phitosterol, sucrose, rosmanol, 2,5-deoxyfructosazine, 2,6-deoxyfructosazine, fructosazine, maltitol, epicatechin, nothofagin, orientin, catechin, epigallocatechin, coumaroyl quinic acid, tocoferol, chlorogenic acid, stigmasterol, rosmarinic acid, betulinic acid, oleanolic acid, ursolic acid, glyderinine, epicatechin gallate, catechin gallate, epigallocatechin gallate, gallocatechin gallate, solanesol, and the like. For additional exemplary compounds, see, e.g., Santhosh et al., Phytomedicine, 12 (2005) 216-220, which is incorporated herein by reference.

The botanical material can be used in the smokeless tobacco compositions and products of the invention in a variety of forms. Exemplary forms include plant materials in shredded or particulate (e.g., a milled or ground product in a form characterized as granular or powder) form. Exemplary forms also include isolated components of plant materials in forms such as oils, aqueous extracts, or alcohol (e.g., ethanol) extracts, which can be optionally used in solid form (e.g., freeze-dried or spray-dried form).

In certain embodiments, the non-tobacco botanical will provide advantageous sensory characteristics (e.g., taste, aroma, or color) or other functional benefits, such as function as a binder or filler. In certain embodiments, the non-tobacco botanical may be associated with desirable bioactivity or health-related effects such as antioxidant qualities. In particularly preferred embodiments, the non-tobacco botanical components will complement the sensory characteristics associated with tobacco-derived materials in the formulation, and in some cases, will even contribute tobacco-like sensory characteristics. In some embodiments, the presence of the non-tobacco botanical is associated with mouth and throat sensory characteristics that are not dissonant with the overall desirable sensory characteristics of the product and, in some cases, can contribute to a reduction in mouth and/or throat irritation otherwise associated with the formulation. Green tea (*Camellia sinesis*), guayusa, rooibos (particularly green rooibos) and honeybush (particularly red honeybush) are particularly advantageous non-tobacco botanical components that can lead to the desirable characteristics set forth above.

Honeybush (genus *Cyclopia*) is a flowering plant in the legume family named for the honey-like aroma of its flowers. The honeybush plant is unique to South Africa and exemplary species include *Cyclopia genistoides, Cyclopia longifolia, Cyclopia maculata, Cyclopia subternata*, and *Cyclopia intermedia*. The leaves of the honeybush plant are sometimes used in tisanes. The shoots (leaves and twigs) of the Honeybush plant are typically harvested and chopped or shredded. Thereafter, the plant material can be used as-is in "green" form, which is lighter in color and less sweet, or subjected to a fermenting process to produce "red" honeybush, which enhances the sweetness and produces a rich amber color. Honeybush in either form can be purchased from specialty tea distributors. The honeybush plant is rich in antioxidants, such as mangiferin, and is being studied for its possible cancer-protective benefits. See Kokotkiewicz, A & Luczkiewics, M. 2009. Honeybush (*Cyclopia* sp.)—A rich source of compounds with high antimutagenic properties. Fitoterapia 80 (2009) 3-11. In certain embodiments, honeybush is present in an amount of up to about 15 dry weight percent, such as about 1 to about 5 dry weight percent in aqueous extract form, or about 5 to about 10 dry weight percent in powder form.

Like honeybush, rooibos (*Aspalathus linearis*) is also a flowering plant in the legume family indigenous to South Africa, and its leaves are also used in tisanes. The rooibos plant is harvested and processed in a manner similar to honeybush described above, and is available in green or red (fermented) forms. Rooibos in either faun can be purchased from specialty tea distributors. The rooibos plant is rich in antioxidants and is being studied for its possible health-protective benefits. See The Science Behind Roobios— South Africa's Unique and Healthy Herbal Tea, South African Rooibos Council, July 2013. In certain embodiments, rooibos is present in an amount of up to about 15 dry weight percent, such as about 1 to about 5 dry weight percent in aqueous extract form, or about 5 to about 10 dry weight percent in powder form.

In various embodiments, at least a portion of a botanical material can be added in an aqueous and/or alcohol-based form. For example, a juice or a fermented liquid (e.g., wine, beer, or other alcoholic beverages) can entirely or partially replace a water component used in forming a smokeless tobacco product. Exemplary aqueous components include fruit juice, vegetable juice, and wine. After the smokeless tobacco product is formed, the water and/or alcohol from the juice evaporates as the moisture content of the product is reduced, leaving behind non-aqueous components in the smokeless tobacco product. These residual components can impart flavors, aromas, colors, and other sensory properties on the smokeless product. Any type of fruit juice, juice derived from other botanical materials, and/or fermented juice derived from botanical materials can replace a suitable amount of the water used to fabricate a smokeless product, such that the desired level of residual components remain in the final product. Such components can be useful for providing hydration of the binder, and also useful for introducing functional properties associated with the botanical component from which the liquid is derived, such as certain sensory characteristics (e.g., flavor, aroma, or color) or bioactivity or health benefits associated with the botanical. In particular, the addition of red wine can produce favorable changes in flavor and antioxidant properties of the smokeless product.

For example, red wine can be used to replace a suitable amount of the water used to produce a smokeless tobacco product. As the smokeless product is dried to reduce the moisture content of the final product, the alcohol in the wine evaporates and leaves various residual components behind that can introduce a reddish color to the final product, flavoring in the product, and aromas.

Botanical materials can be evaluated for their antioxidant character and for other potential benefits. The evaluation of a botanical material or evaluation of a tobacco product incorporating a botanical material can be done, for example, based on the antioxidant character as described by two indices, ORAC (Oxygen Radical Absorbance Capacity) and FRAP (Ferric Reducing Ability Potential).

The ORAC assay provides an index which describes the degree and length of time in which a substance (antioxidant) is able to inhibit the action of an oxidizing agent acting on a fluorescent substrate. The assay is based on the measurement of the kinetics of the oxidation reaction. The antioxidant activity (or index) can be characterized by the number of moles of free radicals scavenged by an antioxidant. The antioxidant mechanisms include hydrogen atom transfer (HAT), single electron transfer followed by proton transfer (SET or ET-PT), and the sequential proton loss electron transfer (SPLET). Each of these mechanisms involves different kinetics. For the HAT mechanism, the reactions can be summarized as follows:

$$ROO^{\cdot}+AH \rightarrow ROOH+A^{\cdot}$$

$$ROO^{\cdot}+A^{\cdot} \rightarrow ROOA$$

For the SET mechanism, the reactions can be summarized as follows:

$$ROO^{\cdot}+AH \rightarrow ROO^{-}+AH^{+}$$

$$ROO^{\cdot}+AH^{+} \rightarrow ROO^{-}AH^{+}$$

$$ROO^{-}AH^{+} \rightarrow ROOH+A^{\cdot}$$

$$ROO^{\cdot}+A^{\cdot} \rightarrow ROOA$$

For the SPLET mechanism, the reactions can be summarized as follows:

$$ROO^{\cdot}+AH \rightarrow ROO^{-}+AH^{+}$$

$$ROO^{-}AH^{+} \rightarrow ROOH+A^{\cdot}$$

$$ROO^{\cdot}+A^{\cdot} \rightarrow ROOA$$

The end result of the three mechanisms is essentially the same: the transformation of a peroxide radical into a much less reactive species.

Antioxidant measurements methods are typically based on the measurement of the rate of reaction of a free radical generator with a compound that has color or fluorescence, in the presence of a standard antioxidant, or the presence of an antioxidant substance to be evaluated. For example, in various embodiments of the invention, the radical used in the ORAC assay can be a peroxyl radical produced by 2,2-azobis(2-amidinopropane) dihydrochloride (AAPH), for example. This compound decomposes and generates $N_2$ and two radicals. These radicals react with molecular oxygen to produce peroxyl radicals. The peroxyl radicals can either react with the antioxidant by removing a hydrogen atom from it or by damaging a specific fluorescent reagent resulting in a loss of fluorescence. For example, a fluorescent protein (R-PE or R-phycoerythrin) can be used as the fluorescent material. Fluorescein can also be used as a fluorescent probe material. Upon reaction with the peroxyl radicals, the fluorescent material yields a non-fluorescent product and the loss of fluorescence can be measured with a fluorimeter. The degree of an antioxidant protection is quantified by comparison with a standard antioxidant (e.g., 6-hydroxy-2,5,7,8-tetramethylchroman-2-carboxylic acid, also known as Trolox which is a vitamin E analogue) and expressed in TEs (trolox equivalents). Different concentrations of Trolox can be used to make a standard curve. The measurement of ORAC index can be performed for example, following a procedure described in Ou B., Hampsch-Woodill M., Prior R. L. *Development and validation of an improved oxygen radical absorbance capacity assay using fluorescein as the fluorescent probe*, J. Agric. Food Chem., 49 (2001) 4619-4626 and Ou B., Hampsch-Woodill M., Flanagan J., Deemer E. K., Prior R. L., Huang D. J., *Novel fluorometric assay for hydroxyl radical prevention capacity using fluorescein as the probe*, J. Agric. Food. Chem. 50 (2002) 2772-2777, each of which is herein incorporated by reference.

In general, ground botanical material can be extracted with a solution containing approximately 50% acetone and 50% water. After extraction, the liquid and solid can be separated by filtration. A sample from the extract can then be diluted with diluent. The ORAC assay can measure both hydrophilic materials and lipophilic materials. For example, in a first version of the procedure, the dilution can be done with a phosphate buffer solution at approximately pH of 7.2. This returns hydrophilic ORAC values. A second version of the procedure can use a diluent of approximately 50% acetone and 50% water, which returns lipophilic ORAC values. The hydrophilic and lypophilic ORAC values tend to be in the same general range for a given sample. Therefore, for the purposes of the discussion herein, reference to an ORAC value can include both hydrophilic or lypophilic ORAC measurements.

In some embodiments of the present invention, botanical materials that can be useful in a tobacco product have an ORAC index value of about 250 (µmol/TE)/g or greater, about 350 (µmol/TE)/g or greater, about 500 (µmol/TE)/g or greater, or about 1000 (µmol/TE)/g or greater.

The FRAP analysis is based on the reduction of a $Fe^{3+}$ salt to a $Fe^{2+}$ salt, and the reaction of $Fe^{2+}$ with 2,4,6-tripyridyl-s-triazine which generates a colored complex. The color of the complex (absorbance) can be measured at a specified wavelength using a spectrophotometer. The measurement of the FRAP index can be performed, for example, following a procedure described in Benzie, I. F. F., Strain, J. J., *The ferric reduction ability of plasma (FRAP) as a measure of "antioxidant power": the FRAP assay*, Anal. Biochem., 239 (1996) 70-76, herein incorporated by reference. Since both the ORAC index and the FRAP index measure the antioxidant property of a material, the correlation between the two indices is relatively strong. The FRAP index values are expressed in (µmol/$Fe^{2+}$)/g values. In some embodiments of the present invention, botanical materials useful in tobacco products described herein can have an FRAP index value of approximately 250 (µmol/$Fe^{2+}$)/g or greater, about 350 (µmol/$Fe^{2+}$)/g or greater, about 500 (µmol/$Fe^{2+}$)/g or greater, about 1000 (µmol/$Fe^{2+}$)/g, or about 1500 (µmol/$Fe^{2+}$)/g or greater.

The selection of the plant from the *Nicotiana* species (i.e., tobacco material) utilized in the products and processes of the invention can vary; and in particular, the types of tobacco or tobaccos may vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *rustica* tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. Various representative types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al.; U.S. Pat. No. 7,025,066 to Lawson et al.; and U.S. Pat. No. 7,798,153 to Lawrence, Jr.; and US Patent Appl. Pub. No. 2008/0245377 to Marshall et al.; each of which is incorporated herein by reference. Tobacco compositions including dark air cured tobacco are set forth in US Patent Appl. Pub. No. 2008/0245377 to Marshall et al., which is incorporated herein by reference. See also, types of tobacco as set forth, for example, in US Patent Appl. Pub. No. 2011/0247640 to Beeson et al., which is incorporated herein by reference.

Exemplary *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis subsp. Hersperis, N. pauciflora, N. petunioides, N. quadrivalvis, N. repanda, N. rotundifolia, N. solanifolia* and *N. spegazzinii*.

*Nicotiana* species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No.

7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and PCT WO 2008/103935 to Nielsen et al. See, also, the types of tobaccos that are set forth in U.S. Pat. No. 4,660,577 to Sensabaugh, Jr. et al.; U.S. Pat. No. 5,387,416 to White et al.; and U.S. Pat. No. 6,730,832 to Dominguez et al., each of which is incorporated herein by reference.

For the preparation of smokeless tobacco products, it is typical for harvested plants of the *Nicotiana* species to be subjected to a curing process. Descriptions of various types of curing processes for various types of tobaccos are set forth in *Tobacco Production, Chemistry and Technology*, Davis et al. (Eds.) (1999). Especially preferred techniques and conditions for curing flue-cured tobacco are set forth in Nestor et al., *Beitrage Tabakforsch. Int.*, 20 (2003) 467-475 and U.S. Pat. No. 6,895,974 to Peele, which are incorporated herein by reference. Representative techniques and conditions for air curing tobacco are set forth in Roton et al., *Beitrage Tabakforsch. Int.*, 21 (2005) 305-320 and Staaf et al., *Beitrage Tabakforsch. Int.*, 21 (2005) 321-330, which are incorporated herein by reference. Certain types of tobaccos can be subjected to alternative types of curing processes, such as fire curing or sun curing. Typically, harvested tobaccos that are cured are then aged.

Various parts or portions of the plant of the *Nicotiana* species can be employed. For example, virtually all of the plant (e.g., the whole plant) can be harvested, and employed as such. Alternatively, various parts or pieces of the plant can be harvested or separated for further use after harvest. For example, the flower, leaves, stem, stalk, roots, seeds, and various combinations thereof, can be isolated for further use or treatment.

The post-harvest processing of the tobacco plant or portion thereof can vary. After harvest, the plant, or portion thereof, can be used in a green form (e.g., the plant or portion thereof can be used without being subjected to any curing process). For example, the plant or portion thereof can be used without being subjected to significant storage, handling or processing conditions. A tobacco plant or portion thereof can be refrigerated or frozen for later use, freeze-dried, subjected to irradiation, yellowed, dried, cured, cooked (e.g., roasted, fried or boiled), or otherwise subjected to storage or treatment for later use.

The harvested tobacco plant or portion thereof can be physically processed. The plant or portion thereof can be separated into individual parts or pieces (e.g., the leaves can be removed from the stems, and/or the stems and leaves can be removed from the stalk). The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders). The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent.

The tobacco material can be used in the smokeless tobacco compositions and products of the invention in a variety of forms. Exemplary forms include tobacco materials in shredded or particulate (e.g., a milled or ground product in a form characterized as granular or powder) form. Exemplary foams also include isolated components of tobacco materials in forms such as oils or aqueous extracts, which can be optionally used in solid form (e.g., freeze-dried or spray-dried form). In various embodiments, the tobacco material can be a tobacco-derived nicotine solution. In certain embodiments, the tobacco is employed in the form of parts or pieces that have an average particle size less than that of the parts or pieces of shredded tobacco used in so-called "fine cut" tobacco products. Typically, the very finely divided tobacco particles or pieces are sized to pass through a screen of about 18 or 16 Tyler mesh, generally are sized to pass a screen of about 20 Tyler mesh, often are sized to pass through a screen of about 50 Tyler mesh, frequently are sized to pass through a screen of about 60 Tyler mesh, may even be sized to pass through a screen of 100 Tyler mesh, and further may be sized so as to pass through a screen of 200 Tyler mesh. If desired, air classification equipment may be used to ensure that small sized tobacco particles of the desired sizes, or range of sizes, may be collected. In one embodiment, the tobacco material is in particulate form sized to pass through an 18 or 16 Tyler mesh, but not through a 60 Tyler mesh. If desired, differently sized pieces of granulated tobacco may be mixed together.

Typically, the very finely divided tobacco particles or pieces suitable for snus products have a particle size greater than −8 Tyler mesh, often −8 to +100 Tyler mesh, frequently—16 to +60 Tyler mesh. In certain embodiments, the tobacco is provided with an average particle size of about 0.3 to about 2 mm, more often about 0.5 to about 1.5 mm, and most often about 0.75 to about 1.25 mm (e.g., about 1 mm). The milled tobacco material is typically employed in the form of parts or pieces that have an average particle size less than about 50 microns. In one embodiment, the average particle size of the tobacco particles may be less than or equal to about 25 microns.

The manner by which the tobacco is provided in a finely divided or powder type of form may vary. Preferably, tobacco parts or pieces are comminuted, ground or pulverized into a powder type of form using equipment and techniques for grinding, milling, or the like. Most preferably, the tobacco is relatively dry in form during grinding or milling, using equipment such as hammer mills, cutter heads, air control mills, or the like. For example, tobacco parts or pieces may be ground or milled when the moisture content thereof is less than about 15 weight percent to less than about 5 weight percent.

The plant of the *Nicotiana* species or portions thereof can be subjected to other types of processing conditions. For example, components can be separated from one another, or otherwise fractionated into chemical classes or mixtures of individual compounds. Typical separation processes can include one or more process steps such as solvent extraction using polar solvents, organic solvents, or supercritical fluids, chromatography, distillation, filtration, recrystallization, and/or solvent-solvent partitioning. Exemplary extraction and separation solvents or carriers include water, alcohols (e.g., methanol or ethanol), hydrocarbons (e.g., heptane and hexane), diethyl ether methylene chloride and supercritical carbon dioxide. Various extraction techniques of tobacco materials can be used to provide a tobacco extract and tobacco pulp. See, for example, the extraction processes described in US Pat. Appl. Pub. No. 2011/0247640 to Beeson et al., which is incorporated herein by reference. Other exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, all of which are incorporated by reference herein.

In certain embodiments, a solvent is added to the tobacco material and the material is soaked for a given period of time (e.g., about 1 h). Following the extraction process, the tobacco pulp is generally isolated from the tobacco extract, for example, by filtration or centrifugation, although these methods are not intended to be limiting. Alternatively, in some embodiments, the tobacco pulp can be isolated from the extract by means of distillation (e.g., steam distillation) of the tobacco mixture. See also, the types of separation techniques set forth in Brandt et al., *LC-GC Europe*, p. 2-5 (March, 2002) and Wellings, *A Practical Handbook of Preparative HPLC* (2006), which are incorporated herein by reference. In addition, the plant or portions thereof can be subjected to the types of treatments set forth in Ishikawa et al., *Chem. Pharm. Bull.*, 50, 501-507 (2002); Tienpont et al., *Anal. Bioanal. Chem.*, 373, 46-55 (2002); Ochiai, *Gerstel Solutions Worldwide*, 6, 17-19 (2006); Coleman, III, et al., *J. Sci. Food and Agric.*, 84, 1223-1228 (2004); Coleman, III et al., *J. Sci. Food and Agric.*, 85, 2645-2654 (2005); Pawliszyn, ed., *Applications of Solid Phase Microextraction, RSC Chromatography Monographs*, (Royal Society of Chemistry, UK) (1999); Sahraoui et al., *J. Chrom.*, 1210, 229-233 (2008); and U.S. Pat. No. 5,301,694 to Raymond et al., which are all incorporated herein by reference.

The tobacco extract can also be subjected to further treatment steps. In some embodiments, the extract is brought into contact with an imprinted polymer or non-imprinted polymer such as described, for example, in US Pat. Pub. Nos. 2007/0186940 to Bhattacharyya et al; 2011/0041859 to Rees et al.; 2011/0159160 to Jonsson et al; and 2012/0291793 to Byrd et al., all of which are incorporated herein by reference. In some embodiments, the extract is clarified and/or concentrated by reverse osmosis. Still further, the tobacco extract could be treated with ion exchange materials having amine functionality, which can remove certain aldehydes and other compounds. See, for example, U.S. Pat. No. 4,033,361 to Horsewell et al and U.S. Pat. No. 6,779,529 to Figlar et al., which are incorporated by reference herein.

Tobacco pulp that has been provided and isolated following the extraction step can be whitened in certain embodiments according to any means known in the art. For example, whitening methods using various bleaching or oxidizing agents and oxidation catalysts can be used. Exemplary oxidizing agents include peroxides (e.g., hydrogen peroxide), chlorite salts, chlorate salts, perchlorate salts, hypochlorite salts, ozone, ammonia, and combinations thereof. Exemplary oxidation catalysts are titanium dioxide, manganese dioxide, and combinations thereof.

If desired, the tobacco materials can be irradiated, pasteurized, or otherwise subjected to controlled heat treatment. Such treatment processes are detailed, for example, in US Pat. Pub. No. 2009/0025738 to Mua et al., which is incorporated herein by reference. The tobacco material could also be treated with enzymes and/or probiotics to inhibit acrylamide formation or otherwise chemically alter the tobacco material as discussed in US Pat. Pub. Nos. 2010/0300463, 2011/0048434, and 2012/0060854 to Chen et al., U.S. patent application Ser. No. 13/444,272 to Marshall et al., filed on Apr. 11, 2012 and U.S. patent application Ser. No. 13/553,222 to Moldoveanu, filed on Jul. 19, 2012, which are incorporated herein by reference. Exemplary enzymes that can be used to treat the tobacco extract include amylases (which catalyze the breakdown of starch into sugars) or proteases (which catalyze the hydrolysis of peptide bonds of proteins) or a combination thereof. Certain types of probiotics and compositional ingredients that can be used to treat tobacco include examples set forth in U.S. Pat. No. 8,097,245 to Harel et al.; U.S. Pat. No. 8,097,281 to Heim et al.; U.S. Pat. No. 8,101,167 to Gueniche; and U.S. Pat. No. 8,101,170 to Plail et al., which are all incorporated herein by reference.

Reference to "tobacco extract" as explained above encompasses extracts highly purified with respect to one or a few components thereof. For example, highly purified tobacco-derived nicotine (e.g., pharmaceutical grade nicotine having a purity of greater than 98% or greater than 99%) or a derivative thereof can be used in the present invention. Representative nicotine-containing extracts can be provided using the techniques set forth in U.S. Pat. No. 5,159,942 to Brinkley et al., which is incorporated herein by reference. Extracts containing relatively high nicotine content can be buffered, e.g., using buffering agents such as citric acid to lower the pH of the extracts. Additionally, the tobacco extract could be an extract enriched in antioxidants such as flavonoids, such as described in Example 21.

The relative amount of tobacco material within the smokeless tobacco products of the invention may vary. Typically, the amount of tobacco material within the smokeless tobacco product is at least about 10%, at least about 25%, or at least about 50%, and in some cases, at least about 60%, at least about 70%, at least about 80%, or at least about 90% on a dry weight basis of the product. A typical range of tobacco material within the product is about 10 to about 99%, more often about 25 to about 75% by weight on a dry basis.

The amount of botanical material incorporated into a smokeless tobacco product will vary, depending in part on the desired functional or sensory characteristics of the product, the type and form of the botanical material, the type and form of the smokeless tobacco product, and the like. A representative amount of botanical material in the smokeless tobacco products of the invention is at least about 0.1%, at least about 1%, at least about 5%, at least about 10%, or at least about 15%, and in some cases, at least about 20%, at least about 30%, at least about 40%, or at least about 50% on a dry weight basis of the product. A typical range of botanical material within the product is about 0.1 to about 60%, more often about 5 to about 40% by weight on a dry basis.

A larger amount of certain botanical materials can be used to achieve a higher antioxidant character of the product. Where an extract is used as the botanical material, lesser amounts may be needed to achieve the desired product characteristics. In certain embodiments where a botanical extract is used, the botanical material can comprise about 1% or less, or about 0.5% or less of the total dry weight of the smokeless tobacco product. In one embodiment, the botanical material is either (i) a shredded or particulate botanical material present in an amount of at least about 1% of the total dry weight (or at least about 5%) of the smokeless tobacco product; or (ii) a botanical material extract present in any amount of at least about 0.1% of the total dry weight (or at least about 0.5%) of the smokeless tobacco product.

The relative amount of tobacco material and botanical material can also be expressed in terms of weight ratio of tobacco to botanical within the smokeless tobacco product, with exemplary ratios including about 99:1 to about 40:60, such as about 80:20 to about 50:50.

The components of the smokeless tobacco composition, including the tobacco material, the botanical material, and any additional ingredients described herein, can be brought together in admixture using any mixing technique or equipment known in the art. The various components can be admixed together in multiple steps or in a single step. Any mixing method that brings the tobacco composition ingredients into intimate contact can be used. A mixing apparatus featuring an impeller or other structure capable of agitation is typically used. Exemplary mixing equipment includes casing drums, conditioning cylinders or drums, liquid spray apparatus, conical-type blenders, ribbon blenders, mixers available as FKM130, FKM600, FKM1200, FKM2000 and FKM3000 from Littleford Day, Inc., Plough Share types of mixer cylinders, and the like. As such, the overall mixture of various components with the tobacco material may be relatively uniform in nature. See also, for example, the types of methodologies set forth in U.S. Pat. No. 4,148,325 to Solomon et al.; U.S. Pat. No. 6,510,855 to Korte et al.; and U.S. Pat. No. 6,834,654 to Williams, each of which is incorporated herein by reference.

The overall smokeless tobacco composition or product can also be characterized based on ORAC index value or FRAP index value. Such values will vary depending on the type of smokeless tobacco product, the type and amount of tobacco material present, and the type and amount of other botanical material present. For example, certain exemplary smokeless tobacco products (including snus type products) have an ORAC index value of at least about 50 ($\mu$mol/TE)/g, at least about 75 ($\mu$mol/TE)/g, or at least about 100 ($\mu$mol/TE)/g, or in certain embodiments, at least about 120 ($\mu$mol/TE)/g, at least about 140 ($\mu$mol/TE)/g, or at least about 160 ($\mu$mol/TE)/g. Exemplary smokeless tobacco products (including snus type products) have an FRAP index value of at least about 80 ($\mu$mol/Fe$^{2+}$)/g, at least about 100 ($\mu$mol/Fe$^{2+}$)/g, at least about 140 ($\mu$mol/Fe$^{2+}$)/g, at least about 200 ($\mu$mol/Fe$^{2+}$)/g, or in certain embodiments, at least about 220 ($\mu$mol/Fe$^{2+}$)/g, at least about 260 ($\mu$mol/Fe$^{2+}$)/g, at least about 300 ($\mu$mol/Fe$^{2+}$)/g. In certain embodiments, particularly products having a meltable or dissolvable base composition, the index values may be slightly lower. Exemplary smokeless tobacco products of this type can have an ORAC index value of at least about 20 ($\mu$mol TE)/g or a FRAP index value of at least about 50 ($\mu$mol/Fe$^{2+}$)/g.

The form of the smokeless tobacco product of the invention can vary. In one particular embodiment, the product is in the form of a snus-type product containing a particulate tobacco material and a particulate botanical material. Manners and methods for formulating snus-type tobacco formulations will be apparent to those skilled in the art of snus tobacco product production.

Referring to FIG. 1, there is shown a first embodiment of a smokeless tobacco product 10. The tobacco product 10 includes a moisture-permeable container in the form of a pouch 12, which contains a snus-type particulate mixture 14 comprising a mixture of a tobacco material and a botanical material. As shown in FIG. 2, for example, the smokeless tobacco product also may optionally comprise a plurality of microcapsules 16 dispersed within the particulate material 14, the microcapsules containing an additive (e.g., a flavorant) such as described in greater detail below.

The tobacco product 10 is typically used by placing one pouch containing the tobacco formulation in the mouth of a human subject/user. During use, saliva in the mouth of the user causes some of the components of the product to pass through the water-permeable pouch and into the mouth of the user. The pouch preferably is not chewed or swallowed. The user is provided with tobacco flavor and satisfaction, and is not required to spit out any portion of the product. After about 10 minutes to about 60 minutes, typically about 15 minutes to about 45 minutes, of use/enjoyment, substantial amounts of the product and have been ingested by the human subject, and the pouch may be removed from the mouth of the human subject for disposal.

The moisture content of the smokeless tobacco product prior to use by a consumer of the formulation may vary. For example, a representative snus-type product may exhibit a moisture content of about 20 weight percent to about 50 weight percent, preferably about 20 weight percent to about 40 weight percent. The manner by which the moisture content of the formulation is controlled may vary. For example, the formulation may be subjected to thermal or convection heating.

Most preferably, moist tobacco formulations, such as the types of tobacco formulations employed within snus types of products, are subjected to pasteurization or fermentation. Techniques for pasteurizing/heat treating and/or fermenting snus types of tobacco products will be apparent to those skilled in the art of snus product design and manufacture.

As noted above, the smokeless tobacco composition can be housed within a moisture-permeable packet or pouch that acts as a container for use of the tobacco. The composition/construction of such packets or pouches, such as the container pouch 12 in the embodiment illustrated in FIG. 1, may be varied. Suitable packets, pouches or containers of the type used for the manufacture of smokeless tobacco products are available under the tradenames CatchDry, Ettan, General, Granit, Goteborgs Rape, Grovsnus White, Metropol Kaktus, Mocca Anis, Mocca Mint, Mocca Wintergreen, Kicks, Probe, Prince, Skruf and TreAnkrare. The smokeless tobacco formulation may be contained in pouches and packaged, in a manner and using the types of components used for the manufacture of conventional snus types of products. The pouch provides a liquid-permeable container of a type that may be considered to be similar in character to the mesh-like type of material that is used for the construction of a tea bag. Components of the loosely arranged smokeless tobacco formulation readily diffuse through the pouch and into the mouth of the user.

An exemplary pouch may be manufactured from materials, and in such a manner, such that during use by the user, the pouch undergoes a controlled dispersion or dissolution. Such pouch materials may have the form of a mesh, screen, perforated paper, permeable fabric, or the like. For example, pouch material manufactured from a mesh-like form of rice paper, or perforated rice paper, may dissolve in the mouth of the user. As a result, the pouch and tobacco formulation each may undergo complete dispersion within the mouth of the user during normal conditions of use, and hence the pouch and tobacco formulation both may be ingested by the user. Other exemplary pouch materials may be manufactured using water dispersible film forming materials (e.g., binding agents such as alginates, carboxymethylcellulose, xanthan gum, pullulan, and the like), as well as those materials in combination with materials such as ground cellulosics (e.g., fine particle size wood pulp). Preferred pouch materials, though water dispersible or dissolvable, may be designed and manufactured such that under conditions of normal use, a significant amount of the tobacco formulation contents permeate through the pouch material prior to the time that the pouch undergoes loss of its physical integrity. If desired, flavoring ingredients, disintegration aids, and other desired components, may be incorporated within, or applied to, the pouch material.

The amount of material contained within each pouch may vary. In smaller embodiments, the dry weight of the material within each pouch is at least about 50 mg to about 150 mg. For a larger embodiment, the dry weight of the material within each pouch preferably does not exceed about 300 mg to about 500 mg. In some embodiments, each pouch/container may have disposed therein a flavor agent member, as described in greater detail in U.S. Pat. No. 7,861,728 to Holton, Jr. et al., which is incorporated herein by reference. If desired, other components can be contained within each pouch. For example, at least one flavored strip, piece or sheet of flavored water dispersible or water soluble material (e.g., a breath-freshening edible film type of material) may be disposed within each pouch along with or without at least one capsule. Such strips or sheets may be folded or crumpled in order to be readily incorporated within the pouch. See, for example, the types of materials and technologies set forth in U.S. Pat. No. 6,887,307 to Scott et al. and U.S. Pat. No. 6,923,981 to Leung et al.; and The EFSA Journal (2004) 85, 1-32; which are incorporated herein by reference.

Descriptions of various components of snus types of products and components thereof also are set forth in US Pat. App. Pub. No. 2004/0118422 to Lundin et al., which is incorporated herein by reference. See, also, for example, U.S. Pat. No. 4,607,479 to Linden; U.S. Pat. No. 4,631,899 to Nielsen; U.S. Pat. No. 5,346,734 to Wydick et al.; and U.S. Pat. No. 6,162,516 to Derr, and US Pat. Pub. No. 2005/0061339 to Hansson et al.; each of which is incorporated herein by reference. See, also, the types of pouches set forth in U.S. Pat. No. 5,167,244 to Kjerstad, which is incorporated herein by reference. Snus types of products can be manufactured using equipment such as that available as SB 51-1/T, SBL 50 and SB 53-2/T from Merz Verpackungmaschinen GmBH. Snus pouches can be provided as individual pouches, or a plurality of pouches (e.g., 2, 4, 5, 10, 12, 15, 20, 25 or 30 pouches) can connected or linked together (e.g., in an end-to-end manner) such that a single pouch or individual portion can be readily removed for use from a one-piece strand or matrix of pouches.

Products of the present invention may be packaged and stored in much the same manner that conventional types of smokeless tobacco products are packaged and stored. For example, a plurality of packets or pouches may be contained in a cylindrical container. If desired, moist tobacco products (e.g., products having moisture contents of more than about 20 weight percent) may be refrigerated (e.g., at a temperature of less than about 10° C., often less than about 8° C., and sometimes less than about 5° C.). Alternatively, relatively dry tobacco products (e.g., products having moisture contents of less than about 15 weight percent) often may be stored under a relatively wide range of temperatures.

The invention is not limited to snus-type smokeless tobacco products. For example, the mixture of tobacco material and botanical material can also be incorporated into various smokeless tobacco forms such as loose moist snuff, loose dry snuff, chewing tobacco, pelletized tobacco pieces, extruded tobacco strips or pieces, finely divided or milled agglomerates of powdered pieces and components, flake-like pieces (e.g., that can be formed by agglomerating tobacco formulation components in a fluidized bed), molded tobacco pieces (e.g., formed in the general shape of a coin, cylinder, bean, cube, or the like), pieces of tobacco-containing gum, products incorporating mixtures of edible material combined with tobacco pieces and/or tobacco extract, products incorporating tobacco (e.g., in the form of tobacco extract) carried by a solid inedible substrate, and the like. For example, the smokeless tobacco product can have the form of compressed tobacco pellets, multi-layered extruded pieces, extruded or formed rods or sticks, compositions having one type of tobacco formulation surrounded by a different type of tobacco formulation, rolls of tape-like films, readily water-dissolvable or water-dispersible films or strips (see, for example, US Pat. Appl. Pub. No. 2006/0198873 to Chan et al.), or capsule-like materials possessing an outer shell (e.g., a pliable or hard outer shell that can be clear, colorless, translucent or highly colored in nature) and an inner region possessing tobacco or tobacco flavor (e.g., a Newtoniam fluid or a thixotropic fluid incorporating tobacco of some form).

In certain embodiments, the smokeless tobacco products of the invention will combine the tobacco material and the non-tobacco botanical material with a base composition that is meltable and/or dissolvable. For example, the base composition could be in the form of a "pastille," which refers to a dissolvable oral product made by solidifying a liquid or gel composition, such as a composition that includes a gelling or binding agent, so that the final product is a hardened solid gel. Pastilles generally form a dissolvable and lightly chewable smokeless tobacco product. Alternatively, the base composition could be in the form of a lozenge formulation. Additional examples of base compositions include gels, pastes, extruded sticks or other shapes, and the like.

In some embodiments, smokeless tobacco products of the invention can have the form of a lozenge, tablet, microtab, or other tablet-type product. See, for example, the types of lozenge formulations and techniques for formulating or manufacturing lozenges and pastilles set forth in U.S. Pat. No. 4,967,773 to Shaw; U.S. Pat. No. 5,110,605 to Acharya; U.S. Pat. No. 5,733,574 to Dam; U.S. Pat. No. 6,280,761 to Santus; U.S. Pat. No. 6,676,959 to Andersson et al.; U.S. Pat. No. 6,248,760 to Wilhelmsen; and U.S. Pat. No. 7,374,779; US Pat. Pub. Nos. 2001/0016593 to Wilhelmsen; 2004/0101543 to Liu et al.; 2006/0120974 to Mcneight; 2008/0020050 to Chau et al.; 2009/0081291 to Gin et al.; 2010/0004294 to Axelsson et al.; 2012/0138074 to Cantrell et al.;

2012/0118310 to Cantrell et al.; 2012/0138073 to Cantrell et al.; and 2013/0074856 to Holton, Jr.; which are incorporated herein by reference.

Certain types of lozenge compositions can be prepared via any method commonly used for the preparation of hard boiled confections. Exemplary methods for the preparation of hard confections can be found, for example, in LFRA Ingredients Handbook, Sweeteners, Janet M. Dalzell, Ed., Leatherhead Food RA (December 1996), pp. 21-44, which is incorporated herein by reference.

Typically, when forming a lozenge product, a first mixture of ingredients is prepared. The composition of the first mixture of ingredients can vary; however, it typically comprises a sugar substitute and may contain various additional substances (e.g., the sugar alcohol syrup, NaCl, preservatives, further sweeteners, water, and/or flavorings). In certain embodiments, it comprises the sugar substitute, salt, and vanillin. In other embodiments, the first mixture comprises the sugar substitute and the sugar alcohol syrup. Typically, the first mixture of ingredients does not contain treated tobacco extract or other tobacco material.

The first mixture of ingredients is heated until it melts; subsequently, the mixture is heated to or past the hard crack stage. In confectionery making, the hard crack stage is defined as the temperature at which threads of the heated mixture (obtained by pulling a sample of cooled syrup between the thumb and forefinger) are brittle or as the temperature at which trying to mold the syrup results in cracking. According to the present method, the temperature at which the hard crack stage is achieved can vary, depending on the specific makeup of the product mixture but generally is between about 145° C. and about 170° C. Typically, the mixture is not heated above about 171° C., which is the temperature at which caramelization begins to occur. In the processes of the present invention, the mixture is typically heated to the hard crack stage temperature or above and then allowed to cool. The heating can be conducted at atmospheric pressure or under vacuum. Typically, the method of the present invention is conducted at atmospheric pressure.

In one exemplary embodiment, the first mixture of ingredients comprises a high percentage of isomalt and the mixture is heated to about 143° C. Once all components are dissolved, the temperature is raised past the hard crack stage (e.g., to about 166° C.). The mixture is heated to this temperature and then removed from the heat to allow the mixture to cool.

In certain embodiments, a tobacco extract and a botanical component (e.g., a non-tobacco botanical extract) and, optionally, additional components (e.g., additional tobacco materials, sweeteners, fillers, flavorants, and water) as described below are separately combined. The tobacco extract-containing mixture is added to the first mixture of ingredients, typically after the first mixture of ingredients has been removed from the heat. The addition of the treated tobacco extract-containing mixture may, in some embodiments, occur only after the heated first mixture of ingredients has cooled to a predetermined temperature (e.g., in certain embodiments, to about 132° C.). In certain embodiments, one or more flavorants are added to the treated tobacco extract-containing mixture immediately prior to adding the mixture to the first, heated mixture of ingredients. Certain flavorants are volatile and are thus preferably added after the mixture has cooled somewhat.

The combined mixture is then formed into the desired shape. In certain embodiments, the mixture is poured directly into molds, formed (e.g., rolled or pressed) into the desired shape, or extruded. If desired, the mixture can be extruded or injection molded. In certain embodiments, the mixture is formed or extruded into a mold of desired shape in an enclosed system, which may require decreased temperature and which may limit evaporation of certain mixture components. For example, such a system may limit the evaporation of volatile components including, but not limited to, flavorants. Other methods of producing smokeless tobacco products and/or lozenges are also intended to be encompassed herein.

To form an exemplary pastille product, the ingredients forming the dissolvable smokeless tobacco composition are prepared such that the mixture thereof may be used in a starch molding process. Exemplary pastille production processes are set forth in U.S. Pat. No. 4,725,440 to Ridgway et al and U.S. Pat. No. 6,077,524 to Bolder et al., which are incorporated by reference herein.

In one embodiment, the process comprises providing an aqueous mixture for mixing with dry ingredients. In some instances, the aqueous mixture may be formed by hydrating a binder material with water, and then admixing the hydrated binder with a sweetener and/or other liquid or dissolvable components, using a high shear mixer or a Hobart mixing bowl with a whipping attachment.

In a separate mixer, a plurality of sugar alcohols can be combined and heated to a high temperature, typically above the hard crack stage for the predominant sugar alcohol. For instance, where isomalt is the predominant ingredient, the sugar alcohol is melted and heated to above 155° C. (e.g., about 160 to about 180° C.), optionally in the presence of other less volatile ingredients such as salt, and then cooled and added to the hydrated gum and mixed in thoroughly. This aqueous mixture typically has a moisture content of at least about 30 percent by weight water, based on the total weight of the mixture.

The aqueous mixture is mixed with a tobacco material and other botanical material and optionally other dry additives, in, for example, a Hobart mixing bowl to form a smokeless tobacco composition in slurry form. The smokeless tobacco composition may then be heated to an elevated temperature for a period of time, for example, heated to between about 40° C. to about 80° C., and typically heated to about 70° C., for a period of about 1 to about 3 minutes. The resulting smokeless tobacco composition typically has a moisture content of at least about 25 percent by weight water, based on the total weight of the mixture.

The viscosity of the heated and deaerated mixture may be measured using, for example, a Brookfield viscometer HA Series, SC4 water jacket, 27/13R sample chamber and a No. 27 spindle. The mixture will typically have a viscosity of about 5.7 Pascal-seconds (Pa·s) to about 6.2 Pa·s when heated to a temperature of about 38° C., about 4.9 Pa·s to about 5.4 Pa·s when heated to a temperature of about 43° C., and about 4.2 Pa·s to about 4.7 Pa·s when heated to a temperature of about 50° C. In some instances, extra water may be added to the smokeless tobacco composition so as to provide a desired viscosity thereof.

Once the desired viscosity is achieved, the heated smokeless tobacco composition may then be deposited into a mold, such as, for example, a starch mold. While the process as further described herein is directed to forming a smokeless tobacco product using a starch mold, it is noted that other types of molds may be used in the process, such as, for example, starchless molds, plastic tray molds, metallic tray molds, neoprene tray molds, etc.

In instances involving the use of starch molds, the starch molds can be pre-dried to remove moisture content from the starch mold itself. That is, prior to receiving the slurry or viscous smokeless tobacco composition, the starch mold may be subjected to an elevated temperature to drive out moisture in the starch mold.

The smokeless tobacco composition remains in the starch mold at an elevated temperature such as, for example, between about 40° C. to about 80° C. (e.g., at least about 40° C. or at least about 50° C.), and typically about 60° C. The smokeless tobacco composition may be held at the elevated temperature for a predetermined duration of time such as, for example, about 15-25 hours, so as to allow the smokeless tobacco composition to cure and solidify into pastille form, while driving the moisture content of the smokeless tobacco composition to a desired final moisture level. In this regard, curing generally refers to the solidification process in which moisture loss occurs, the viscosity of the composition is raised, and chemical and physical changes begin to occur (e.g., crystallization, cross-linking, gelling, film forming, etc.). The smokeless tobacco composition is allowed to cool and thereafter removed from the starch mold.

The smokeless tobacco composition is then typically allowed to post-cure for a time and at a temperature suitable to allow the composition to become equilibrated to a desired moisture, shape and form. The time and temperature can vary without departing from the invention and depend in part on the desired final characteristics of the product. In one embodiment, the post-cure is conducted at ambient temperature for at least about 20 hours after being removed from the mold. The resultant pastille product may be provided in individual pieces weighing between about 0.5 grams to about 5 grams, although aspects of the present disclosure are not limited to such weights.

According to other aspects of the present disclosure, rather than using molds to prepare the smokeless tobacco product, an extrusion process may be employed in which the final smokeless tobacco product is extruded. In some instances, the smokeless tobacco composition in wet mixture form may be formed into a sheet and allowed to dry to a moisture content, for example, of about 15 percent to about 25 percent by weight water to form a tacky or otherwise pasty material, which is in a form capable of physical handling. The material may then be chopped or otherwise cut into smaller pieces using, for example, a mixer. The chopped material may then be extruded through an extrusion device to any shape/size desired, including shapes that may be difficult or impossible to achieve with a mold. In some instances, the extruded product may then be dried to achieve a desired moisture content. A similar type of process is described, for example, in U.S. Pat. No. 3,806,617 to Smylie et al., which is incorporated herein by reference in its entirety. Further, the smokeless tobacco composition may be subjected to a co-extrusion process with another composition.

Depending on the type of smokeless tobacco product being processed, the tobacco product can include one or more additional components in addition to the tobacco material and the botanical material as described above. For example, the tobacco material and botanical material can be processed, blended, formulated, combined and/or mixed with other materials or ingredients, such as other tobacco materials or flavorants, fillers, binders, pH adjusters, buffering agents, salts, sweeteners, colorants, disintegration aids, humectants, and preservatives (any of which may be an encapsulated ingredient as shown in FIG. 2). See, for example, those representative components, combination of components, relative amounts of those components and ingredients relative to tobacco, and manners and methods for employing those components, set forth in US Pat. Pub. Nos. 2011/0315154 to Mua et al. and 2007/0062549 to Holton, Jr. et al. and U.S. Pat. No. 7,861,728 to Holton, Jr. et al., each of which is incorporated herein by reference.

Exemplary flavorants that can be used are components, or suitable combinations of those components, that act to alter the bitterness, sweetness, sourness, or saltiness of the smokeless tobacco product, enhance the perceived dryness or moistness of the formulation, or the degree of tobacco taste exhibited by the formulation. Flavorants may be natural or synthetic, and the character of the flavors imparted thereby may be described, without limitation, as fresh, sweet, herbal, confectionery, floral, fruity, or spicy. Specific types of flavors include, but are not limited to, vanilla, coffee, chocolate/cocoa, cream, mint, spearmint, menthol, peppermint, wintergreen, eucalyptus, lavender, cardamon, nutmeg, cinnamon, clove, cascarilla, sandalwood, honey, jasmine, ginger, anise, sage, licorice, lemon, orange, apple, peach, lime, cherry, strawberry, and any combinations thereof. See also, Leffingwell et al., Tobacco Flavoring for Smoking Products, R. J. Reynolds Tobacco Company (1972), which is incorporated herein by reference. Flavorings also may include components that are considered moistening, cooling or smoothening agents, such as eucalyptus. These flavors may be provided neat (i.e., alone) or in a composite (e.g., spearmint and menthol, or orange and cinnamon). Representative types of components also are set forth in U.S. Pat. No. 5,387,416 to White et al.; US Pat. App. Pub. No. 2005/0244521 to Strickland et al.; and PCT Application Pub. No. WO 05/041699 to Quinter et al., each of which is incorporated herein by reference. Types of flavorants include salts (e.g., sodium chloride, potassium chloride, sodium citrate, potassium citrate, sodium acetate, potassium acetate, and the like), natural sweeteners (e.g., fructose, sucrose, glucose, maltose, mannose, galactose, lactose, and the like), artificial sweeteners (e.g., sucralose, saccharin, aspartame, acesulfame K, neotame, and the like); and mixtures thereof. The amount of flavorants utilized in the tobacco composition can vary, but is typically up to about 10 dry weight percent, and certain embodiments are characterized by a flavorant content of at least about 1 dry weight percent, such as about 1 to about 10 dry weight percent. Combinations of flavorants are often used, such as about 0.1 to about 2 dry weight percent of an artificial sweetener, about 0.5 to about 8 dry weight percent of a salt such as sodium chloride and about 1 to about 5 dry weight percent of an additional flavoring.

Exemplary filler materials include vegetable fiber materials such as sugar beet fiber materials (e.g., FIBREX® brand filler available from International Fiber Corporation), oats or other cereal grain (including processed or puffed grains), bran fibers, starch, or other modified or natural cellulosic materials such as microcrystalline cellulose. Additional specific examples include corn starch, maltodextrin, dextrose, calcium carbonate, calcium phosphate, lactose, mannitol, xylitol, and sorbitol. The amount of filler, where utilized in the tobacco composition, can vary, but is typically up to about 20 dry weight percent, and certain embodiments are characterized by a filler content of up to about 10 dry weight percent, up to about 5 dry weight percent or up to about 1 dry weight percent. Combinations of fillers can also be used.

Typical binders can be organic or inorganic, or a combination thereof. Representative binders include povidone, sodium carboxymethylcellulose and other modified cellulosic materials, sodium alginate, xanthan gum, starch-based binders, gum arabic, pectin, carrageenan, pullulan, zein, and the like. The amount of binder utilized in the tobacco composition can vary, but is typically up to about 30 dry weight percent, and certain embodiments are characterized by a binder content of at least about 5 dry weight percent, such as about 5 to about 30 dry weight percent.

Preferred pH adjusters or buffering agents provide and/or buffer within a pH range of about 6 to about 10, and exemplary agents include metal hydroxides, metal carbonates, metal bicarbonates, and mixtures thereof. Specific exemplary materials include citric acid, sodium hydroxide, potassium hydroxide, potassium carbonate, sodium carbonate, and sodium bicarbonate. The amount of pH adjuster or buffering material utilized in the tobacco composition can vary, but is typically up to about 5 dry weight percent, and certain embodiments can be characterized by a pH adjuster/buffer content of less than about 0.5 dry weight percent, such as about 0.05 to about 0.2 dry weight percent.

A colorant may be employed in amounts sufficient to provide the desired physical attributes to the tobacco formulation. Exemplary colorants include various dyes and pigments, such as caramel coloring, titanium dioxide, and curcumin. The amount of colorant utilized in the tobacco composition can vary, but is typically up to about 3 dry weight percent, and certain embodiments are characterized by a colorant content of at least about 0.1 dry weight percent, such as about 0.5 to about 3 dry weight percent.

Exemplary humectants include glycerin and propylene glycol. The amount of humectant utilized in the tobacco composition can vary, but is typically up to about 5 dry weight percent, and certain embodiments can be characterized by a humectant content of at least about 1 dry weight percent, such as about 2 to about 5 dry weight percent.

Other ingredients such as preservatives (e.g., potassium sorbate) or disintegration aids (e.g., microcrystalline cellulose, croscarmellose sodium, crospovidone, sodium starch glycolate, pregelatinized corn starch, and the like) are typically used in amounts of up to about 10 dry weight percent and usually at least about 0.1 dry weight percent, such as about 0.5 to about 10 dry weight percent. A disintegration aid is generally employed in an amount sufficient to provide control of desired physical attributes of the tobacco formulation such as, for example, by providing loss of physical integrity and dispersion of the various component materials upon contact of the formulation with water (e.g., by undergoing swelling upon contact with water).

In certain embodiments, one or more substances are added to the smokeless tobacco composition for the purpose of soothing throat irritation that may develop during use of the product. The throat irritation mitigant can include any substance capable of mitigating or soothing irritation caused by the smokeless tobacco product, and expressly includes counter-irritants, anesthetics, and demulcents. Examples of throat irritation mitigants include sodium citrate, honey, ginger, pectin, capsaicin, camphor, dextromethorphan, echinacea, zinc gluconate, peppermint oil, spearmint oil, eucalyptus oil, glycerin, organic acids (e.g., citric acid, lactic acid, levulinic acid, or succinic acid), and combinations or extracts thereof (e.g., oleoresin ginger). Organic acids function by shifting the pH of the product into the acidic range, such as the pH range of about 3 to about 6.5. Typically, the organic acid is an organic acid containing at least one carboxylic acid group (e.g., carboxylic acids, dicarboxylic acids, and tricarboxlic acids). The amount of throat irritation mitigant used in the product can vary, but will be an amount sufficient to provide some degree of relief for throat irritation (e.g., a decrease in scratchy, lumpy sensations in the throat, a decrease in pain upon swallowing, a decrease in hoarseness while speaking, or a decrease in coughing). In exemplary embodiments, the throat irritation mitigant is present in an amount of at least about 1 weight percent, or at least about 2 weight percent, or at least about 3 weight percent (e.g., about 1 to about 10 weight percent).

The acidity or alkalinity of the smokeless tobacco product, which is often characterized in terms of pH, can vary and will depend, in part, on whether the product is formulated with a pH adjuster or buffering agent. Typically, the pH of the formulation will fall within the range of about 4.5 to about 9. If a base or alkaline buffering agent is present, the pH is typically toward the upper end of the range, such as about 6.5 to about 8. If the product is formulated without a pH adjuster or buffering agent, in certain embodiments, the pH will range from about 4.5 to about 6.5. A representative technique for determining the pH of a tobacco formulation involves dispersing 5 g of that formulation in 100 ml of high performance liquid chromatography water, and measuring the pH of the resulting suspension/solution (e.g., with a pH meter).

Certain products of the present invention also can have outer coatings (e.g., an outer coating can be composed of ingredients such as carnauba wax and/or pharmaceutically acceptable forms of shellacs, glazing compositions and surface polish agents). Application of a coating can be accomplished using techniques such as airless spraying, fluidized bed coating, use of a coating pan, or the like. Materials for use as a coating can be polymeric in nature, such as cellulosic material (e.g., cellulose butyrate phthalate, hydroxypropyl methylcellulose phthalate, and carboxymethyl ethylcellulose), and polymers and copolymers of acrylic acid, methacrylic acid, and esters thereof.

The smokeless tobacco product can be packaged within any suitable inner packaging material and/or outer container. See also, for example, the various types of containers for smokeless types of products that are set forth in U.S. Pat. No. 7,014,039 to Henson et al.; U.S. Pat. No. 7,537,110 to Kutsch et al.; U.S. Pat. No. 7,584,843 to Kutsch et al.; U.S. Pat. No. D592,956 to Thiellier; U.S. Pat. No. D594,154 to Patel et al.; and U.S. Pat. No. D625,178 to Bailey et al.; US Pat. Pub. Nos. 2008/0173317 to Robinson et al.; 2009/0014343 to Clark et al.; 2009/0014450 to Bjorkholm; 2009/0250360 to Bellamah et al.; 2009/0266837 to Gelardi et al.; 2009/0223989 to Gelardi; 2009/0230003 to Thiellier; 2010/0084424 to Gelardi; and 2010/0133140 to Bailey et al; 2010/0264157 to Bailey et al.; 2011/0168712 to Bailey et al.; and 2011/0204074 to Gelardi et al., which are incorporated herein by reference.

Although the focus of the invention is on combinations of tobacco material with a separate botanical material, any of the botanical materials set forth herein could also be incorporated into various oral products without a tobacco component, such as in non-tobacco pouched products, lozenges, films, tablets, gels, sticks, and the like.

The following examples are provided to illustrate further the present invention, but should not be construed as limiting the scope thereof. Unless otherwise noted, all parts and percentages are by weight.

EXPERIMENTAL

The present invention is more fully illustrated by the following examples, which are set forth to illustrate the present invention and are not to be construed as limiting thereof. In the following examples, g means gram, L means liter, mL means milliliter, and Da means daltons. All weight

Example 1

Ten botanicals known for their antioxidant character and for their reported potential health benefits are evaluated. The botanicals evaluated are: green tea (*Camellia sinensis*), rosemary (*Rosmarinus officinalis*), oregano (*Origanum vulgare*), sage (*Salvia officinalis*), hibiscus flower (*Hibiscus rosa*), cloves (*Syzygium aromaticum*), turmeric (*Curcuma longa*), rosehip (*Rosa canina*), yerba mate (*Ilex paraguariensis*), and cocoa powder (*Theobroma cacao*). To this list, a typical flue-cured tobacco blend (*Nicotiana tabacum*) and a burley blend are added and analyzed by the same procedures as the botanicals.

The ORAC and FRAP indices are measured for each of the botanicals and the tobacco blends. The ORAC assay provides an index which describes the degree and length of time in which each botanical material evaluated is able to inhibit the action of an oxidizing agent acting on a fluorescent substrate (expressed as TEs or trolox equivalents). The FRAP index is based on the measurement of reduction of $Fe^{3+}$ to $Fe^{2+}$ by the antioxidants (expressed as $Fe^{2+}$ concentration). These indices provide guidance as to which botanicals upon addition to tobacco products will have a higher potential to increase the antioxidant characteristics of the product.

The ORAC assay is based on the measurement of the kinetics of the oxidation reaction, as described above. The reagents used for the assay are obtained as a kit from Cell Biolabs, Inc. (San Diego, Calif., 92126, USA), but the same solutions can be made using separately purchased chemicals. The kit contains 0.5 mL fluorescein solution (100×), a sample of solid free radical indicator, 0.1 mL of a 5 mM solution of Trolox, and 50 mL solution of diluent (4×) at pH=7.25. The working solutions are about 20 mL of diluent solution 1:4 with deionized water; about 150 µL per sample evaluated of fluorescein solution made 1:100 fluorescein+diluent (this solution may be slightly adjusted to lead to a 1000 LU fluorescence reading); 0.2 mM stock Trolox solution made by ⅕ dilution of solution from the kit, wherein 7 dilutions standards are prepared from this diluted Trolox stock solution; and 80 mg/mL solution of AAPH in phosphate buffer solution at pH=8.1 (about 250 µL solution is made with approximately 20 mg AAPH).

The calibration curve is generated as follows. 25 µL of Trolox calibration solution is placed in a well from a 96-well clear bottom black Microtiter plate. To this solution 150 µL of fluorescein solution is added. The plate with several solutions in cells is placed in the fluorescence measuring instrument. The fluorescence measuring is performed with a Gemini XPS Fluorescence Microplate Reader (Molecular Devices, Sunnyvale, Calif. 94089, USA) with an extraction wavelength at 480 nm, and emission at 520 nm. The software of the instrument is SoftMax Pro, which allows multiple readings and measurement of areas under the curves. The temperature of the solutions is set at 37° C. The readings for all plates are performed at intervals of 30 seconds for 20 mins. The readings of all standards should be around 1000 LU. After 20 mins, the plate is removed from the reading instrument and allowed to cool at room temperature for about 5-10 mins. Following cooling, about 25 µL of AAPH solution is placed in every cell with Trolox+fluorescein. Immediately, the 96 well plate is placed in the Gemini XPS instrument, shook for 5 seconds. Upon reaction with the peroxyl radicals produced by AAPH, the fluorescent material yields a non-fluorescent product and the loss of fluorescence is measured with the fluorimeter. The fluorescence measurement is performed every 30 seconds for a period of 30 minutes. A graph is generated showing readings for a set of 7 standards showing the kinetics of the oxidation reaction. With the areas from the standards, a calibration curve is generated which plots area under the fluorescence curve versus Trolox concentration. Due to the variability of the kinetic reaction, a duplicate of standards is run together with the samples evaluated.

ORAC values for each evaluated sample are measured by two versions of the procedure described above, one indicated as hydrophilic ORAC and the other as lipophilic ORAC. For the hydrophilic version, the dilution is done with a phosphate buffer solution at pH=7.2, while for the lipophilic versions the dilution is performed with 50% acetone and 50% water (v/v). The phosphate buffer solution with pH=7.2 and at a concentration $7.5 \cdot 10^{-2}$ mol/L is prepared by mixing 64.2 mL $Na_2HPO_4$ solution with 35.8 mL solution $KH_2PO_4$. The solution of $Na_2HPO_4$ is prepared by dissolving 13.363 g $Na_2HPO_4 \cdot 2H_2O$ in 1 L water, and the solution of $KH_2PO_4$ is prepared by dissolving 10.217 g $KH_2PO_4$ in 1 L water. The solution of fluorescein is prepared at a concentration of $10^{-6}$ mol/L using double dilution from solid fluorescein, and the stock trolox solution is prepared at a concentration of 5 mmol/L from trolox. The 2,2-azobis(2-amidinopropane) dihydrochloride (AAPH) used is solid. For the calibration of the hydrophilic ORAC, the stock solution of Trolox is diluted with the phosphate buffer solution at seven different levels. For the lipophilic ORAC the calibration concentrations are identical with that for hydrophilic test, but the dilution is performed using 50% acetone and 50% water (v/v).

The preparation of samples for measurement of ORAC values is performed as follows. First, 500 mg fine ground plant material is extracted with 20 mL of a solution containing 50% acetone and 50% water (v/v). The extraction is performed for 30 min on a wrist action shaker (Burrell Co., Pittsburgh, Pa., USA). After extraction, the liquid and solid are separated by filtration through a 0.45 µm pore PVDF Watman Autovial (Watman, Clifton, N.J.). From the extract, 40 µL are further diluted to 1.0 mL with diluent. This solution is further diluted 20 times, by taking 10 µL into 190 µL diluent to generate 200 µL, and thereby bring responses within the calibration range. From this diluted sample, 25 µL are placed in a well on the 96 well plate, to which 150 µL of fluorescein is added and then incubated for about 30 mins. To this solution, 25 µL of 80 mg/mL AAPH solution is added. Each sample is measured in duplicate. The ORAC value is measured using the same procedure described above for the standard samples.

The ORAC index values for each of the tested materials are indicated below in Table 1. The ORAC index is expressed in TEs (trolox equivalent µmol/g botanical). The ORAC indices shown below represent values obtained by the direct duplicate measurements according to the procedure outlined above, and the relative standard deviation between the measurements was in the range of 0.5% to 10%. As shown in Table 1, the ORAC hydro and ORAC lipo numbers are similar for most evaluated botanicals, since the initial extraction of the sample was performed for both cases in acetone/water (50/50 v/v), and further dilution did not affect solubility.

TABLE 1

ORAC values for botanicals and two tobacco samples

| Material | ORAC hydro (µmol TE)/g | ORAC lipo (µmol TE)/g |
|---|---|---|
| Green tea dry leaf | 1003 | 911 |
| Rosemary | 602 | 610 |
| Oregano | 637 | 716 |
| Sage rubbed | 705 | 636 |
| Hibiscus flower | 312 | 319 |
| Cloves | 2616 | 2999 |
| Turmeric powder | 410 | 590 |
| Rose hip dry | 1246 | 1498 |
| Yerba mate | 1043 | 1097 |
| Cocoa | 430 | 572 |
| Flue-cured tobacco | 471 | 419 |
| Burley tobacco | 134 | 146 |

The FRAP analysis is based on the reduction of a $Fe^{3+}$ salt to a $Fe^{2+}$ salt, and the reaction of $Fe^{2+}$ with 2,4,6-tripyridyl-s-triazine which generates a colored complex. The color of the complex (absorbance) is measured at 620 nm using a Microplate Reader spectrophotometer SpectraMax 340 PC[384] (Molecular Devices, Sunnyvale, Calif. 94089, USA). For the analysis, the following reagents are prepared: 1) 300 mmol/L acetate buffer at pH 3.6 made from 3.1 g $CH_3COONa \times 3H_2O$ and 16 mL $CH_3COOH$ in 1.0 L water, 2) 10 mmol/L TPTZ (2,4,6-tripyridyl-s-triazine) and 40 mmol/L HCl, made from 312.33 mg TPTZ and 146 mg HCl for 100 mL solution, 3) 20 mmol/L $FeCl_3$ $6H_2O$ made from 540.59 mg $FeCl_3$ $6H_2O$ for 100 mL solution. A working FRAP reagent is prepared by mixing 10 mL acetate buffer with 1 mL TPTZ solution and 1 mL $FeCl_3$ solution. The working FRAP reagent is made daily (for utilization). The calibration of FRAP measurement is made using a set of standards made from a stock solution of $FeSO_4$ $7H_2O$ in the range 100 to 2000 µmol/L. The stock solution in this study is made from 56.82 mg $FeSO_4$ $7H_2O$ in 100 mL solution in water, and corresponded to 2044 µmol/L $Fe^{2+}$. From this solution, standards containing 2044 µmol/L, 1533 µmol/L, 1022 µmol/L, 511 µmol/L, 255.5 µmol/L, and 127.8 µmol/L are prepared by dilution with water. For the measurement, 200 µL of reagent is added to each sample cell of a 96 well plate. The plate is placed in the SpectraMax 340 PC[384] instrument, is shaken for 10 seconds, and allowed to equilibrate at 37° C. for 10 minutes. After the equilibration, a 10 µL, sample (or standard) is added to each cell and the absorbance is measured every 30 seconds for a period of 10 minutes at 620 nm.

The FRAP index values for each of the analyzed materials are indicated in Table 2. The FRAP index is expressed in µmol $Fe^{2+}$/g.

TABLE 2

FRAP values for botanicals and two tobacco samples

| Material | FRAP average (µmol $Fe^{2+}$)/g | SD (µmol $Fe^{2+}$)/g |
|---|---|---|
| Green tea dry leaf | 1799 | 28.3 |
| Rosemary dry | 788 | 61.1 |
| Oregano leaf | 862 | 45.9 |
| Sage rubbed | 710 | 212.9 |
| Hibiscus flower | 367 | 1.5 |
| Cloves | 4647 | 151.8 |
| Turmeric powder | Not analyzed* | — |
| Rose hip dry | 1545 | 54.8 |
| Yerba mate | 1113 | 61.1 |
| Cocoa powder | 670 | 25.3 |
| Flue-cured tobacco | 377 | 5.1 |
| Burley tobacco | 90 | 5.5 |

*The yellow color of turmeric interferes with the analysis

The ten botanicals known for their antioxidant character and for their potential health benefits are also evaluated using a GC/MS scanning technique. For comparison with the evaluated botanicals, two tobaccos are included and evaluated regarding the same parameters as the other botanicals. The types of antioxidant compounds predominantly found in each botanical and tobacco blend is described below.

The scanning technique consists of direct silylation of the sample followed by a GC/MS analysis of the extract. For the analysis, duplicate samples of 50 mg were weighed (with 0.1 mg precision) in GC vials (2 mL screw top vials with septa, Agilent, Wilmington, Del. 19808). The silylation is done to all the compounds containing active hydrogens, such as acids, alcohols, or amines. The result is the formation of various trimethylsilyl (TMS) derivatives.

A reagent and a solvent are used for the silylation process. The reagent is bis(trimethylsilyl)-trifluoroacetamide (BSTFA) with 1% trimethylchlorosilane (TMCS). The solvent is N,N-dimethylformamide (DMF). The solvent also contains as internal standard tert-butylhydroquinone. The DMF solution with internal standards is prepared using 100 mL DMF and 40 mg tert-butylhydroquinone (all compounds from Aldich/Sigma Saint Louis, Mo. 63178-9916). The final DMF solution contains 0.4 mg/mL tert-butylhydroquinone.

For the analysis, 0.4 mL DMF with internal standards and 0.8 mL BSTFA with 1% TMCS are added to each vial. The vials are kept at 78° C. (in a heating block) for about 30 mins. The vials are then allowed to cool at room temperature for another 30 mins. After cooling, the solution from each vial is filtered through a 0.45 µm PTFE filter (VWR Suwanee, Ga. 30024) into a screw top vials with screw caps with septa and used for the GC/MS analysis. The analysis is done using a GC/MS instrument (such as Agilent 6890/5973 system from Agilent, Wilmington, Del. 19808). Specific modifications are implemented to the initial procedure for extending the analysis to heavier molecules.

The peaks in the chromatograms are characterized by their retention time, mass spectrum and peak areas. The retention time and the mass spectrum are utilized for peak identification. Mass spectral libraries useful for search include Nist8 and Wiley275. A few individual compounds are identified based on comparison with standards. The area count of each peak is measured normalized to the peak area of an internal standard (tertbutylhydroquinone). This type of presentation of results does not provide the quantitative level of different compounds in a sample, but still allows a quantitative comparison indicating which compound is at a higher or a lower level in the samples. The chemical compounds targeted as antioxidants and analyzed in various botanicals by this GC/MS scanning technique do not include molecules with higher molecular weight (>500 MW) such as polymeric antioxidants. Such molecules are analyzed using dedicated HPLC methods.

The GC/MS scan profile of silylated green tea dry leaf confirms the presence of the following characteristic antioxidants expected to be found in green tea:

Menthol (15.87 min)
Caffeine (37.79 min)
Gallic acid (42.23 min)
Caffeic acid (47.60 min)
Epicatechin (63.83 min)
Catechin (64.32 min)
Epigallocatechin (65.18 min)
Coumaroyl quinic acid (67.41 min)
3-Chlorogenic acid (68.11 min)
5-Chlorogenic acid (69.60 min)
A-Tocoferol (68.05 min)
Epicatechin gallate (78.14 min)
Catechin gallate (78.32 min)
Epigallocatechin gallate (78.83 min)
Gallocatechin gallate (79.40 min)

The GC/MS scan profile of silylated rosemary confirms the presence of the following characteristic antioxidants expected to be found in rosemary:

Camphor (11.09 min)
Borneol (14.21 min)
Thymol (18.64 min)
Ascorbic acid (41.71 min)
Rosmaricin (55.68 min)
Carnosic acid (57.54 min)
Carnosol (58.90 min)
Rosmanol (60.19 min)
Rosmarinic acid (72.69 min)
Oleanolic acid (74.02 min)
Betulinic acid (74.35 min)
Ursolic acid (74.77 min)
Betulonic acid (75.23 min)

It is noted that trace amounts of gallic acid (42.22 min) and tocoferol (68.05 min) are also found. Caffeic acid (47.60 min) is present at higher levels than green tea. Also, when comparing the chromatograms for green tea and rosemary, there are significant differences which are in particular related to the antioxidants in the two botanicals. Specifically, green tea contains catechins where as rosemary contains more acids with antioxidant properties. In addition, rosemary contains lighter compounds that contribute to the strong flavor of rosemary, such as camphor, borneol and thymol.

The GC/MS scan profile of silylated oregano confirms the presence of the following characteristic antioxidants expected to be found in oregano:

Borneol (14.19 min)
Menthol (15.87 min)
Thymol (18.64 min)
Caffeine (37.84 min)
Gallic acid (42.22 min)
Caffeic acid (47.61 min)
Carnosic acid (57.52 min)
Epicatechin (63.83 min)
Catechin (64.32 min)
Epigallocatechin (65.19 min)
Coumaroyl quinic acid (67.41 min)
Chlorogenic acid (68.11 min)
Rosmarinic acid (72.65 min)
Oleanolic acid (73.90 min)
Betulinic acid (74.23 min)
Ursolic acid (74.65 min)
Betulonic acid (75.31 min)
Epicatechin gallate (78.04 min)
Catechin gallate (78.85 min)
Epigallocatechin gallate (78.85 min)

Oregano leaf contains a wide range of antioxidants, some of them at relatively low level. Thymol is in particular elevated in oregano leaf, which contributes significantly to its flavor.

The GC/MS scan profile of silylated sage confirms the presence of the following characteristic antioxidants expected to be found in sage:

Camphor (11.06 min)
Borneol (14.19 min)
Thymol (18.64 min)
Caffeine (37.84 min)
Gallic acid (42.22 min)
Caffeic acid (47.61 min)
Rosmaricin (55.67 min)
Carnosic acid (57.50 min)
Carnosol (58.94 min)
Rosmanol (60.19 min)
Rosmarinic acid (72.64 min)
Oleanolic acid (73.97 min)
Betulinic acid (74.23 min)
Ursolic acid (74.72 min)
Betulonic acid (75.13 min)

Sage also contains some sabinol and other volatile compounds typical for essential oils that impart the specific flavor of sage.

The GC/MS scan profile of silylated hibiscus flower (dry) shows several peaks not common to other botanicals evaluated here. These peaks belong to several polyfunctional hydroxyl acids. As reflected in its relatively low ORAC index above, hibiscus flower does not have a significant level of antioxidants. The dry flowers contain sugars (fructose, glucose) and some acids such as citric quinic acid, and other hydroxyl acids. Only a low level of ascorbic acid and some chlorogenic acid were identified as contributors to the antioxidant properties of this material. However, the flower contains some anthocyanidins that are not possible to analyze by the scanning technique described above. These anthocyanidins include delphinidin and cyanidin.

The GC/MS scan profile of silylated cloves confirms the presence of the following characteristic antioxidants expected to be found in cloves:

Caffeine (37.84 min)
Gallic acid (42.22 min)
Caffeic acid (47.61 min)
Coumaroyl quinic acid (67.41 min)
Chlorogenic acid (68.11 min)
Rosmarinic acid (72.65 min)
Oleanolic acid (74.03 min)
Betulinic acid (74.23 min)
Ursolic acid (74.65 min)
Betulonic acid (75.31 min)

Cloves contain a significant proportion of eugenol (24.76 min), and also have a high level of gallic acid and of betulinic acid. These compounds together, having a strong antioxidant character, lead to a high ORAC and FRAP value for cloves.

The GC/MS scan profile of silylated tymeric (ground) shows that turmeric does not contain a significant level of antioxidants, as compared to other botanicals evaluated in this example. A low level of several flavorful volatile compounds such as camphor and thymol are present in turmeric and these may contribute some antioxidant character. Also, a very low level of betulinic acid is present. Different from other botanicals evaluated here, turmeric contains some oxalic acid (11.08 min), ar-turmerone (31.82 min), and curcumin (75.31 min). Tumerone is reported to have some antioxidant properties. Curcumin is a polyphenol which also has antioxidant properties and is responsible for the yellow color of turmeric.

The GC/MS scan profile of silylated rose hip (dry ground) confirms the presence of the following characteristic antioxidants expected to be found in rose hip:

Ascorbic acid (41.71 min)
Gallic acid (42.28 min)
Caffeic acid (trace) (47.61 min)
Epicatechin (trace) (63.83 min)
Catechin (64.32 min)
Coumaroyl quinic acid (67.41 min)
α-Tocoferol (68.03 min)
Oleanolic acid (74.03 min)
Betulinic acid (74.23 min)
Ursolic acid (74.65 min)

The ORAC and FRAP indices for rose are relatively high, indicating good antioxidant properties. These high values are likely generated by the presence of ascorbic acid, oleanolic acid, and betulinic acid, all present in the dry ground material. The main peaks shown in the chromatogram of silylated rose hip belong to carbohydrates (glucose, fructose, and sucrose).

The GC/MS scan profile of silylated yerba mate confirms the presence of the following characteristic antioxidants expected to be found in yerba mate:

Caffeine (37.84 min)
Ascorbic acid (trace) (41.71 min)
Gallic acid (42.22 min)
Caffeic acid (47.61 min)
Epicatechin (63.83 min)
Catechin (64.32 min)
Coumaroyl quinic acid (67.41 min)
Chlorogenic acid (68.11 min)
Chlorogenic acid (2) (73.97 min)
Oleanolic acid (73.97 min)
Betulinic acid (74.23 min)
Ursolic acid (74.63 min)

Yerba mate does not have a profile similar to green tea, which also contains a considerable amount of catechins. Yerba mate does have a considerable level of chlorogenic acid.

The chromatogram of silylated cocoa powder shows trace levels of caffeine (37.84 min), gallic acid (42.22 min), epicatechin (63.80 min), and an additional class of antioxidants known as leucoanthocyanidins. These compounds elute in the separation used herein between 80 and 86 min and include theobromine, theophiline, and leucocyanidin gallate. Leucoanthocyanidins also form proanthocyanidin polymers in which different units of the flavan groups are connected by bonds. These compounds have antioxidant properties; however, the larger molecules cannot be analyzed by the GC/MS scanning technique described above.

For comparison purposes, flue-cured tobacco and burley tobacco are also analyzed. Flue-cured tobacco contains a higher lever of antioxidants, including in particular chlorogenic acid (68.12 min) and some α-tocopherol. This explains the lower ORAC and FRAP indices for burley tobacco compared to flue-cured tobacco. Both tobacco materials have less antioxidant characteristics than the botanicals evaluated.

Example 2

The antioxidant profiles of guayusa leaves are evaluated to determine their potential use in tobacco products. Ilex guayusa is a botanical with antioxidant properties. The plant is grown primarily in Ecuador, but it is also found in parts of Peru and Colombia. Traditionally, guayusa leaves are boiled in water and the resulting beverage is consumed for its stimulative effects, likely due to the content in caffeine and theobromine. Some studies have shown that ingesting guayusa helped reduce hyperglycemia and other side-effects of Type 1 diabetes in animal models.

The antioxidant character of the guayusa leaves as described by ORAC and FRAP indices is evaluated and compared to that of green tea. The measurement of ORAC index is performed following a procedure described in Example 1. The ORAC index values for guayusa and for green tea are indicated below in Table 3. The ORAC index is expressed in TEs (trolox equivalent μmol/g botanical).

TABLE 3

ORAC values for *Guayusa* and for Green Tea

| | Guayusa (hydrophilic) | Guayusa (lipophilic) | Green Tea (hydrophilic) | Green Tea (lipophilic) |
|---|---|---|---|---|
| Average | 562.20 | 596.68 | 925.18 | 872.06 |
| Standard Deviation | 0.85 | 5.08 | 43.48 | 87.45 |
| RSD % | 0.152 | 0.851 | 4.700 | 10.028 |

The FRAP index is measured according to the procedure described in Example 1. The FRAP index values for guayusa and green tea are indicated in Table 4. The FRAP index is expressed in μmol $Fe^{2+}$/g botanical.

TABLE 4

FRAP values for *Guayusa* and for Green Tea

| | Guayusa | Green Tea |
|---|---|---|
| Average | 603.40 | 1651.56 |
| Standard Deviation | 76.88 | 116.74 |
| RSD % | 12.740 | 7.068 |

In addition, the CG/MS scanning technique, as described in Example 1, provides information about the nature and relative level of specific antioxidants found within guayusa leaves. The GC/MS scan profile of guayusa is very different from that of green tea, however, the profile of compounds in guayusa was similar to that of yerba mate, which is also an ilex (*Ilex paraguariensis*). Among the main antioxidants in guayusa and also present in yerba mate are the following:

Caffeine (37.84 min)
Ascorbic acid (trace) (41.71 min)
Gallic acid (42.22 min)
Caffeic acid (47.55 min)
Epicatechin (trace) (63.83 min)
2-Chlorogenic acid (68.11 min)
5-Chlorogenic acid (69.60 min)
Oleanolic acid (trace) (73.97 min)
Betulinic acid (trace) (74.23 min)
Ursolic acid (74.63 min)

In summary, similar to yerba mate, guayusa has a significant level of the two chlorogenic acids (3-Chlorogenic acid and 5-Chlorogenic acid). Theobromine reported to be in guayusa, was not identified in the chromatogram. The level of caffeine in guayusa and yerba mate is about the same. Guayusa has less antioxidant character as compared to green tea. The chromatographic profile of silylated guayusa is different from that of green tea, indicating different compounds contributing to the antioxidant character.

Example 3

The antioxidant profile of rooibos (*Aspalathus linearis*) is evaluated to determine potential use in tobacco products. Rooibos grows in the region of the Western Cape province of South Africa. The leaves are used in a tisane (herbal tea) called bush tea or simply rooibos. Generally, the leaves are subjected to a fermentation that produces a reddish-brown color (red rooibos) and enhanced flavor. Green or unfermented rooibos has a slightly grassy flavor.

The antioxidant character of green and red rooibos as described by ORAC and FRAP indices is evaluated. The measurement of ORAC index is performed following a procedure described in Example 1. The ORAC index values for green and red rooibos are indicated below in Table 5. The ORAC index is expressed in TEs (trolox equivalent μmol/g botanical).

TABLE 5

ORAC values for Green and Red Rooibos

|  | Green rooibos (hydrophilic) | Green rooibos (lipophilic) | Red rooibos (hydrophilic) | Red rooibos (lipophilic) |
|---|---|---|---|---|
| Average | 1035.51 | 793.58 | 629.68 | 547.85 |
| Standard Deviation | 59.61 | 40.89 | 44.32 | 26.78 |
| RSD % | 5.76 | 5.15 | 7.04 | 4.89 |

The FRAP index is measured according to the procedure described in Example 1. The FRAP index values for green and red rooibos are indicated in Table 6. The FRAP index is expressed in μmol $Fe^{2+}$/g botanical.

TABLE 6

FRAP values for Green and Red Rooibos

|  | Green rooibos | Red rooibos |
|---|---|---|
| Average | 1570.37 | 862.95 |
| Standard Deviation | 88.56 | 170.13 |
| RSD % | 5.64 | 19.71 |

As can be seed, green rooibos has larger ORAC values and FRAP values than red rooibos. The apparent loss of antioxidant character of red rooibos is analogous to the loss of antioxidant character of black tea compared to green tea. The ORAC and FRAP values of rooibos are very similar to green tea.

In addition, the CG/MS scanning technique, as described in Example 1, provides information about the nature and relative level of specific antioxidants and other compounds found within rooibos leaves. Among the main compounds found in rooibos are the following:

Malic acid (25.71 min)
I.S. (29.61 min)
Inositol type (37.90 min)
Inositol (45.85 min)
Sucrose (59.69 min)
Aspalathin (77.72 min).

Example 4

The antioxidant profile of honeybush leaves (fermented) is evaluated to determine their potential use in tobacco products. Honeybush (*Cyclopia*) is a genus of flowering plants in the legume family, and its leaves have antioxidant properties. Several species of *Cyclopia* grow in the southwest and southeast of South Africa. The leaves of honeybush are commonly used to make tisanes or herbal teas. The plant has many similarities with rooibos and it is available as green and fermented. The fermentation process is an enzymatic oxidation caused by the plant's intracellular enzymes, which reduces in part the ORAC value of the leaves. The honeybush evaluated here is fermented, but the specific species of plant is unknown. The ORAC and FRAP values as compared with green tea are not very high. The antioxidant character of honeybush is produced by a variety of antioxidant compounds. Unfermented honeybush is reported to be low in tannin (0.45%), but to contain isofavones, flavones, cinnamic acids, coumestans, xanthonoids, mangiferin and isomangiferin. Most of these compounds cannot be evaluated by the GC/MS method used herein. Therefore, it is not determined which of these compounds is still active in the fermented honeybush.

The antioxidant character of the honeybush leaves as described by ORAC and FRAP indices is evaluated and compared to that of green tea. The measurement of ORAC index is performed following a procedure described in Example 1. The ORAC index values for honeybush and for green tea are indicated below in Table 7. The ORAC index is expressed in TEs (trolox equivalent μmol/g botanical).

TABLE 7

ORAC values for Honeybush and for Green Tea

|  | Honeybush (hydrophilic) | Honeybush (lipophilic) | Green Tea (hydrophilic) | Green Tea (lipophilic) |
|---|---|---|---|---|
| Average | 278.60 | 300.05 | 882.29 | 986.29 |
| Standard Deviation | 32.42 | 17.76 | 51.97 | 25.38 |
| RSD % | 11.64 | 5.92 | 5.89 | 2.57 |

The FRAP index is measured according to the procedure described in Example 1. The FRAP index values for honeybush and green tea are indicated in Table 8. The FRAP index is expressed in μmol $Fe^{2+}$/g botanical.

TABLE 8

FRAP values for Honeybush and for Green Tea

|  | Honeybush | Green Tea |
|---|---|---|
| Average | 340.89 | 1578.73 |
| Standard Deviation | 84.89 | 392.10 |
| RSD % | 24.81 | 24.84 |

In addition, the CG/MS scanning technique, as described in Example 1, provides information about the nature and relative level of specific antioxidants and other compounds found within honeybush leaves. Among the main compounds found in honeybush are the following:

Lactic acid (8.05 min)
I.S. (29.60 min)
Pentose-1 (30.98 min)
Hydrocarbon (33.10 min)
Inositol type (37.86 min)
Xylulose (39.97 min)
Hexose (43.16 min)
Glycoside (58.14 min)

Unknown (65.20 min)
Unknown antioxidant glycoside (87.76 min)

Besides some of the carbohydrates, the compounds seen in the chromatogram do not match the antioxidants expected to be found in honeybush, as indicated in the available literature. Furthermore, the specific species of honeybush plant evaluated herein shows less antioxidant characteristics as compared to green tea.

Example 5

The antioxidant properties for an experimental snus with green tea, a pouched product containing microcrystalline cellulose (MCC) and green tea, and a snus control are evaluated. The green tea is a commercial product obtained from the market (Shanghai Tiantan Intern. Trading Co., Ltd.). The experimental snus with green tea sample contains about 16.79% dry weight basis milled green tea. The pouched material with MCC contains about 41.55% milled green tea. The basic ingredients of the snus control include milled lamina+milled stem; salt, $Na_2CO_3$, $NaHCO_3$; sucralose and propylene glycol. The experimental snus with green tea is made by replacing part of the milled lamina and stem in the control with green tea, without significantly changing the proportion of other components in the product. The basic composition of the pouched material is intended to keep the level of MCC plus green tea at a somewhat equivalent dry weight percent level with that of tobacco materials plus green tea within the snus with green tea sample.

The ORAC values and FRAP values for each sample are measured using the same procedures described in Example 1 above. The ORAC values for the samples are given in Table 9 below. The ORAC index is expressed in TEs (trolox equivalent μmol/g botanical).

TABLE 9

ORAC values for 3 samples as well as green tea alone

|  | Snus with Green Tea | Pouched Material with Green Tea | Snus Control | Green Tea |
|---|---|---|---|---|
| Average | 178.14 | 456.33 | 32.52 | 1182.67 |
| RSD % | 6.38 | 3.29 | 6.06 | — |

The FRAP index values for samples and green tea are indicated in Table 10. The FRAP index is expressed in μmol $Fe^{2+}$/g botanical.

TABLE 10

FRAP values for 3 samples and for green tea alone

|  | Snus with Green Tea | Pouched Material with Green Tea | Snus Control | Green Tea |
|---|---|---|---|---|
| Average | 337.70 | 1071.17 | 65.23 | 2488.54 |
| RSD % | 0.64 | 18.44 | 10.54 | — |

In addition, the GC/MS scanning technique described in Example 1 above is used for the evaluation of the relative level of several antioxidant compounds in the three samples and to compare these levels with that from the green tea "as is." The evaluation is done based on the normalized area counts of the peaks generated by the main antioxidant compounds in the chromatographic scans applied on each material. The normalization is performed using the area of an internal standard (400 ppm of tertbutylhydroquinone).

The results of the normalized area counts in the analyzed samples show that the proportion of different antioxidant compounds follows the proportion of green tea in the corresponding product. In summary, the addition of green tea significantly increases the antioxidant properties of the sampled products.

Example 6

The changes in antioxidant properties for an experimental snus blend upon the addition of a small proportion of two botanicals (green tea leaf and freeze-dried rosemary) is evaluated. The ORAC values for snus samples incorporating three levels of freeze dried rosemary (5%, 10% and 20% dry weight basis), snus samples incorporating three levels of green tea (5%, 10% and 20% dry weight basis), and a control snus sample without any botanical additives were measured. The ORAC values for each sample are measured using the same procedures described in Example 1 above.

The ORAC values for the samples are given in Table 11 below. The ORAC index is expressed in TEs (trolox equivalent μmol/g botanical).

TABLE 11

ORAC values for snus tobacco samples mixed with freeze dried rosemary or with green tea

|  | ORAC Average (μM TE)/g | Standard Deviation (μM TE) |
|---|---|---|
| Freeze Dried Rosemary Proportion |  |  |
| 0% | 45.9 | 2.2 |
| 5% | 73.4 | 6.0 |
| 10% | 86.8 | 6.6 |
| 20% | 120.6 | 4.0 |
| Green Tea Proportion |  |  |
| 0% | 41.0 | 3.7 |
| 5% | 70.8 | 10.6 |
| 10% | 91.1 | 6.3 |
| 20% | 145.0 | 4.1 |

The addition of green tea as well as the addition of rosemary to a snus tobacco blend leads to an increase in the ORAC values. Furthermore, the variation in the ORAC values shows a linear dependence on the proportion of botanical product added to the product.

In addition to the measurement of ORAC values, a GC/MS screening according to the procedure described in Example 1 above is performed on the snus samples with either green tea or rosemary added. The chromatography results for the samples indicate the presence of typical tobacco compounds such as sugars, tobacco specific acids, nicotine, phosphate, etc. as well as compounds with expected antioxidant properties specific to green tea or rosemary. The results also show that the level of specific compounds present in the added botanicals can be increased in the composite material.

Example 7

Tobacco products may require to be heated at specific temperatures (often below 100° C.). Also, in order to assure that the materials added to tobacco products are free from bacteria, the botanicals may be required to be heated at temperatures around 100° C. Therefore, the following non-limiting example determines potential changes in the antioxidant properties of green tea and of dry rosemary upon heating for one hour at three different temperatures: 76° C., 93° C. and 110° C.

Samples of 2-3 g of green tea and dry rosemary are weighed in different beakers. Each sample is heated at a different temperature for one hour. The three temperatures used are 76° C., 93° C. and 110° C. After heating, the beakers are covered with aluminum foil and allowed to cool to room temperature. From each sample, the amounts required for each analysis are precisely weighed in duplicate. The ORAC values and FRAP values for each sample are measured using the same procedures described in Example 1 above.

The ORAC values for the samples are given in Tables 12 and 13 below. The ORAC index is expressed in TEs (trolox equivalent μmol/g botanical).

TABLE 12

ORAC values for green tea samples at different temperatures

|  | Room Temperature | 76° C. | 93° C. | 110° C. |
| --- | --- | --- | --- | --- |
| Average | 1182.67 | 1121.29 | 1161.24 | 1241.77 |
| RSD % | — | 6.91 | 5.18 | 1.04 |

TABLE 13

ORAC values for rosemary samples at different temperatures

|  | Room Temperature | 76° C. | 93° C. | 110° C. |
| --- | --- | --- | --- | --- |
| Average | 629.92 | 878.75 | 899.06 | 1017.29 |
| RSD % | — | 12.54 | 12.19 | 5.00 |

The FRAP index values for the samples are indicated in Tables 14 and 15 below. The FRAP index is expressed in $\mu mol\ Fe^{2+}/g$ botanical.

TABLE 14

FRAP values for green tea samples at different temperatures

|  | Room Temperature | 76° C. | 93° C. | 110° C. |
| --- | --- | --- | --- | --- |
| Average | 2488.54 | 2208.51 | 2382.78 | 2415.20 |
| RSD % | — | 1.82 | 3.85 | 4.27 |

TABLE 15

FRAP values for rosemary samples at different temperatures

|  | Room Temperature | 76° C. | 93° C. | 110° C. |
| --- | --- | --- | --- | --- |
| Average | 998.57 | 991.82 | 1185.39 | 1097.68 |
| RSD % | — | 10.35 | 0.72 | 8.96 |

As seen from Tables 12-15, the ORAC and FRAP values for either green tea or dry rosemary when heated up to 110° C. show very little change. In some instances, it even appears that an increase in the ORAC and FRAP values is seen for the heated samples. It is possible these increases are a result of variation in the analytical measurements.

Levels of the specific antioxidant compounds found in the room temperature and heated green tea and rosemary samples are evaluated using the GC/MS scanning technique described above in Example 1. The evaluation is done based on the normalized area counts of the peaks generated by the main antioxidant compounds in the chromatographic scans applied on each material. The normalization is performed using the area of an internal standard (400 ppm of tertbutyl-hydroquinone).

The results show that heating the samples does not significantly change the levels of most antioxidant compounds found within green tea or dry rosemary. Only for rosemary, the level of carnosic acid seems to decrease upon heating at 110° C. Also in rosemary, the levels of the compounds rosmaricin and rosmarinic acid are slightly decreased when the sample is heated at 110° C. for one hour. Overall, the heating of the samples does not significantly affect the antioxidant properties of the analyzed botanicals.

Example 8

A pastille product adapted for use as a substitute for oral snuff is produced using the following weight percentages of ingredients. Note that the percentages listed in Table 16 include water.

TABLE 16

Wet weight percentages of ingredients

| Ingredient | Wet Weight % |
| --- | --- |
| Gum Arabic Powder | 22.00 |
| Cold Water (for hydration of gum) | 22.00 |
| Isomalt Powder | 27.45 |
| Erythritol | 4.90 |
| Maltitol Syrup | 1.50 |
| Glycerin | 1.60 |
| Sucralose | 0.04 |
| Salt (sodium chloride) | 4.50 |
| Milled beet root | 4.57 |
| Fire-cured tobacco spray-dried extract | 3.00 |
| Caramel Color | 1.20 |
| Licorice Flavorant | 0.370 |
| Additional Flavorant | 0.80 |
| Water | 6.00 |
| Capol 570C (Centerchem, Inc.)* | 0.070 |

*0.1% coating applied to finished product as anti-sticking agent

To prepare the product, two times the amount of gum arabic and water are mixed together in a high speed mixer for 30 minutes at a low speed. This mixture is heated overnight at 60° C. and 25% relative humidity in a covered container. The mixture is removed from the heat source and foamy portion is discarded.

220 grams of hydrated gum arabic solution from above is weighed. The actual grams of each ingredient listed here can vary depending on the batch size, but the weight percentages will remain approximately the same. The warm gum mixture is placed into a stirring cooker with paddle on slow and gently stirred while heating to about 155-160° F. (68 to 71° C.).

30 grams of water is weighed into a beaker. About 10.0 grams of salt is added to the water and dissolved. The above indicated recipe levels of sucralose (0.18 grams), Licorice flavor (1.85 grams), caramel color (6.00 grams) and glycerin (8.0 grams) are added to the water and stirred. This water mixture is then added to the stirring cooker.

In a separate heating pan, the isomalt powder (137.25 grams), erythritol (24.50 grams), and maltitol syrup (7.50 grams) are mixed together and heated to about 350° F. (177° C.). While this mixture is heating, about 12.5 grams of salt is added to the stirring cooker. Following the addition of the salt, the additional flavor (4.00 grams) is weighed and added to the stirring cooker. After the isomalt, erythritol and maltitol mixture has been heated to desired temperature, this mixture is cooled to about 290° F. (143° C.) and then added slowly to the stirring cooker. The temperature in the stirring cooker increases, but cools quickly. Once the slurry in the stirring cooker is cooled to 160° F. (71° C.), the milled beet root (22.85 grams having less than about 50 micron average particle size) and the fire-cured spray-dried Extract (15.00 grams) are added to the stirring cooker. The slurry is stirred for one minute. The slurry is then poured into a depositor for depositing.

A starch bed is prepared by preheating a starch tray in 60° C., 25% relative humidity. An impression is made in the in the tray and filled with the slurry using a depositor. After depositing the slurry into the tray, the deposited slurry pieces are covered with sifted corn starch such that there is about 1" height of corn starch above the deposited pieces. The deposited trays are placed in an environmental cabinet for 17 hours at 60° C., 25% relative humidity. The pieces are removed from the starch tray and the remaining starch is sprayed off. 0.1% (0.35 grams) level of anti-stick coating (Capol 570C) is applied by hand or using a coating pan. The moisture level and pH is then measured. Prior to depositing, the starch moisture in the trays is approximately 6% moisture or less after pre-drying in the environmental cabinet. The targeted moisture content in each pastille is about 8% or less after drying. Table 17 below shows the dry weight percent of each ingredient in each pastille made according to the procedure above, as well as the weight percent of each ingredient at a targeted 8% moisture content level. The amount of beet root in the final product can be varied, such as anywhere between about 5 to about 10 dry weight percent.

TABLE 17

Final product weight percentages

| Ingredient | Dry Weight Percent | Weight Percent at 8% Moisture Content |
|---|---|---|
| Gum Arabic Powder | 29.73 | 27.35 |
| Cold Water | 0.00 | 8.00 |
| Isomalt Powder | 39.16 | 36.02 |
| Erythritol | 6.99 | 6.43 |
| Maltitol Syrup | 1.69 | 1.55 |
| Glycerin | 2.38 | 2.19 |
| Sucralose | 0.06 | 0.05 |
| Salt | 6.62 | 6.09 |
| Milled beet root | 6.11 | 5.62 |
| Fire-cured Tobacco Spray-dried Extract | 4.19 | 3.85 |
| Caramel Color | 1.26 | 1.16 |
| Licorice Flavorant | 0.53 | 0.49 |
| Additional Flavorant | 1.19 | 1.09 |
| Capol ® 570C | 0.11 | 0.10 |

Example 9

The following non-limiting example demonstrates a pastille product incorporating milled green tea. The pastille is produced using the same process described above in Example 8; however, the milled beet root is replaced with micro-milled green tea (marketed as Shanghai Special Green Tea). The wet weight percentages remain essentially the same and the final dry weight percentages and weight percentages at 8% moisture content are approximately the same as those listed above in Example 8. The green tea has an average particle size of less than about 50 micron. The amount of green tea in the final product can be varied, such as anywhere between about 3 to about 10 dry weight percent.

Example 10

The following non-limiting example demonstrates a pastille product incorporating milled green tea. The pastille is produced using the same process described above in Example 8; however, the fire-cured spray dried extract is replaced with micro-milled green tea (marketed as Shanghai Special Green Tea) and the milled beet root is replaced with fire-cured milled tobacco. The wet weight percentages remain essentially the same and the final dry weight percentages and weight percentages at 8% moisture content are approximately the same as those listed above in Example 8. The green tea has an average particle size of less than about 50 micron. The amount of green tea in the final product can be varied, such as anywhere between about 3 to about 10 dry weight percent.

Example 11

The following non-limiting example demonstrates a pastille product incorporating rosemary. The pastille is produced using the same process described above in Example 8; however, the milled beet root is replaced with fire-cured milled tobacco and 3.0 wet weight percent of rosemary powder is added to the slurry pot with the fire-cured milled tobacco and the fire-cured spray dried extract. The final dry weight percent and weight percent at 8% MC of the rosemary are 4.22 and 3.88, respectively. The weight percentages of the gum arabic powder, cold water and isomalt powder are slightly decreased to compensate for the additional material. The weight percentages of the remaining ingredients are approximately the same as those listed above in Example 8. The rosemary has an average particle size of less than about 50 micron. The amount of rosemary in the final product can be varied, such as anywhere between about 3 to about 10 dry weight percent.

Example 12

A pastille product is produced using the same general process and formulation set forth in Example 8, except a pharmaceutical grade nicotine composition is used as the tobacco component and the beet root, caramel color, salt and licorice flavorant are removed.

Table 18 below shows the dry weight percent of each ingredient in each pastille made according to this procedure, as well as the weight percent of each ingredient at a targeted 8% moisture content level.

TABLE 18

Final product weight percentages

| Ingredient | Dry Weight Percent | Weight Percent at 8% Moisture Content |
|---|---|---|
| Gum Arabic Powder | 32.17 | 29.60 |
| Cold Water | 0.00 | 8.00 |
| Isomalt Powder | 40.46 | 37.22 |

TABLE 18-continued

Final product weight percentages

| Ingredient | Dry Weight Percent | Weight Percent at 8% Moisture Content |
|---|---|---|
| Erythritol | 7.24 | 6.66 |
| Maltitol Syrup | 1.76 | 1.62 |
| Glycerin | 2.62 | 2.41 |
| Sucralose | 0.03 | 0.03 |
| Milled green tea | 14.77 | 13.58 |
| Tobacco-derived Nicotine | 0.23 | 0.21 |
| Flavorant | 0.62 | 0.57 |
| Capol 570C (Centerchem, Inc.)* | 0.11 | 0.10 |

*0.1% coating applied to finished product as anti-sticking agent

The green tea has an average particle size of less than about 50 micron. The amount of green tea in the final product can be varied, such as from about 5 to about 15 dry weight percent. The gum arabic and isomalt content can be modified to accommodate changes in the green tea weight percentage.

Example 13

A pastille product is produced using the same general process and formulation set forth in Example 12, except only 2.33 dry weight percent of milled green tea is used and the following are added: 2.14 dry weight percent of cocoa and 4.39 dry weight percent of a freeze dried green tea extract. The weight percentages of isomalt and gum arabic are adjusted proportionally in light of these changes.

The green tea extract is prepared by steeping green tea powder in a 10 part water to 1 part green tea (by weight) slurry for about 10 minutes at a temperature of about 180° F. (about 82° C.). After steeping, the liquid extract is filtered through cheesecloth and the extraction process is repeated on the remaining pulp. The combined liquid extract is concentrated by evaporative drying and freeze-dried to form a powder.

Example 14

A pastille product is produced using the same general process and formulation set forth in Example 13, except no milled green tea is added and the freeze dried green tea extract is increased to 6.72 dry weight percent.

Example 15

A pastille product is produced using the same general process and formulation set forth in Example 12, except the flavorant is removed, yerba mate is added at a dry weight percentage of 2.71, the tobacco-derived nicotine is reduced to 0.16 dry weight percent, and the milled green tea is reduced to 2.71 dry weight percent. The dry weight percentages of the remaining ingredients are slightly increased as compared to the percentages indicated above in Example 12.

Example 16

The following non-limiting example demonstrates the process of making a pastille product adapted for use as a substitute for snus. A pastille product is produced using the following weight percentages of ingredients. The ultrafiltered tobacco extract is an extract prepared as described in US Pat. Appl. Pub. Nos. 2013/0074855 and 2013/0074856, both to Holton, Jr., which are incorporated by reference herein. Note that the percentages listed in Table 19 include water.

TABLE 19

Wet weight percentages of ingredients

| Ingredient | Wet Weight % |
|---|---|
| Gum arabic powder | 24.00 |
| Cold water | 24.00 |
| Isomalt powder | 29.002 |
| Erythritol | 5.00 |
| Maltitol syrup | 1.50 |
| Glycerin | 1.50 |
| Sucralose | 0.03 |
| Salt | 1.50 |
| Milled green tea | 4.06 |
| Ultrafiltered fire-cured spray dried extract | 2.45 |
| Colorant | 0.008 |
| Flavorant | 0.60 |
| Water | 6.20 |
| Capol 570C (Centerchem, Inc.)* | 0.150 |

*0.15% coating applied to finished product as anti-sticking agent

To prepare the product, two times the amount of gum arabic and water are mixed together in a high speed mixer for 30 minutes at a low speed. This mixture is heated overnight at 60° C. and 25% relative humidity in a covered container. The mixture is removed from the heat source and foamy portion is discarded.

240 grams of hydrated gum arabic solution from above is weighed. The actual grams of each ingredient listed here can vary depending on the batch size, but the weight percentages will remain approximately the same. The warm gum mixture is placed into a stirring cooker with paddle on slow and gently stirred while heating to about 155-160° F. (68 to 71° C.).

31 grams of water is weighed into a beaker. About 7.5 grams of salt is added to the water and dissolved. The above indicated recipe levels of sucralose (0.15 grams), colorant (0.038 grams) and glycerin (7.5 grams) are added to the water and stirred. This water mixture is then added to the stirring cooker.

In a separate heating pan, the isomalt powder (145.00 grams), erythritol (25.00 grams), and maltitol syrup (7.50 grams) are mixed together and heated to about 350° F. (177° C.). While this mixture is heating, about 3.00 grams of flavorant is added to the stirring cooker. After the isomalt, erythritol and maltitol mixture has been heated to desired temperature, this mixture is cooled to about 290° F. (143° C.) and then added slowly to the stirring cooker. The temperature in the stirring cooker increases, but cools quickly. Once the slurry in the stirring cooker is cooled to 160° F. (71° C.), the milled green tea (20.31 grams) and the ultrafiltered fire-cured spray-dried extract (15.00 grams) are added to the stirring cooker. The slurry is stirred for one minute. The slurry is then poured into a depositor for depositing.

A starch bed is prepared by preheating a starch tray in 60° C., 25% relative humidity. An impression is made in the in the tray and filled with the slurry using a depositor. After depositing the slurry into the tray, the deposited slurry pieces are covered with sifted corn starch such that there is about 1" height of corn starch above the deposited pieces. The deposited trays are placed in an environmental cabinet for 17 hours at 60° C., 25% relative humidity. The pieces are removed from the starch tray and the remaining starch is sprayed off. 0.1% (0.35 grams) level of anti-stick coating (Capol 570C) is applied by hand or using a coating pan. The moisture level and pH is then measured. Prior to depositing, the starch moisture in the trays is approximately 6% moisture or less after pre-drying in the environmental cabinet. The targeted moisture content in each pastille is about 12% or less after drying. Table 20 below shows the dry weight percent of each ingredient in each pastille made according to the procedure above, as well as the weight percent of each ingredient at a targeted 12% moisture content level.

TABLE 20

Weight percentages of ingredients used to produce a pastille product

| Ingredient | Dry Weight Percent | Weight Percent at 12% Moisture Content |
|---|---|---|
| Gum Arabic Powder | 33.29 | 29.29 |
| Cold Water | 0.00 | 12.00 |
| Isomalt Powder | 42.46 | 37.36 |
| Erythritol | 7.32 | 6.44 |
| Maltitol Syrup | 1.73 | 1.53 |
| Glycerin | 2.29 | 2.01 |
| Sucralose | 0.05 | 0.04 |
| Salt | 2.27 | 1.99 |
| Milled Green Tea | 5.95 | 5.23 |
| Ultrafiltered Fire-Cured Spray Dried Extract | 3.51 | 3.09 |
| Colorant | 0.00 | 0.0000254 |
| Flavorant | 0.92 | 0.81 |
| Capol 570C (Centerchem, Inc.)* | 0.23 | 0.20 |

*0.15% coating applied to finished product as anti-sticking agent

Example 17

The following non-limiting example demonstrates a pastille product adapted for use as a substitute for snus using the same general process outlined in Example 16, except the colorant, green tea, and flavorant are removed and replaced with 4.41 dry weight percent of honeybush extract. In addition, the ultrafiltered tobacco extract is replaced with 1.52 dry weight percent of tobacco-derived nicotine. The amounts of isomalt and gum arabic are proportionally adjusted to accommodate the changes in the remaining ingredients. The honeybush extract amount can be varied, such as from about 1 to about 5 dry weight percent.

The honeybush extract is prepared by steeping honeybush powder in a 10 part water to 1 part honeybush (by weight) slurry for about 10 minutes at a temperature of about 180° F. (about 82° C.). After steeping, the liquid extract is filtered through cheesecloth and the extraction process is repeated on the remaining pulp. The combined liquid extract is concentrated by evaporative drying and freeze-dried to form a powder.

Example 18

The following non-limiting example demonstrates a pastille product adapted for use as a substitute for snus using the same general process outlined in Example 17, except the honeybush extract is replaced with a green rooibos extract in an amount of about 4.41 dry weight percent. The rooibos extract amount can be varied, such as from about 1 to about 5 dry weight percent.

The green rooibos extract is prepared by steeping green rooibos powder in a 10 part water to 1 part green rooibos (by weight) slurry for about 10 minutes at a temperature of about 180° F. (about 82° C.). After steeping, the liquid extract is filtered through cheesecloth and the extraction process is repeated on the remaining pulp. The combined liquid extract is concentrated by evaporative drying and freeze-dried to form a powder.

Example 19

The following non-limiting example demonstrates a pastille product adapted for use as a substitute for snus using the same general process outlined in Example 17, except the honeybush extract is replaced with a red (fermented) rooibos extract in an amount of about 4.41 dry weight percent. The rooibos extract amount can be varied, such as from about 1 to about 5 dry weight percent.

The red rooibos extract is prepared by steeping red rooibos powder in a 10 part water to 1 part red rooibos (by weight) slurry for about 10 minutes at a temperature of about 180° F. (about 82° C.). After steeping, the liquid extract is filtered through cheesecloth and the extraction process is repeated on the remaining pulp. The combined liquid extract is concentrated by evaporative drying and freeze-dried to form a powder.

Example 20

The following non-limiting example demonstrates a pastille product adapted for use as a substitute for snus using the same general process outlined in Example 17, except the honeybush extract is replaced with a yerba mate extract in an amount of about 1.24 dry weight percent. The yerba mate extract amount can be varied, such as from about 1 to about 5 dry weight percent.

The yerba mate extract is prepared by steeping yerba mate powder in a 10 part water to 1 part yerba mate (by weight) slurry for about 10 minutes at a temperature of about 180° F. (about 82° C.). After steeping, the liquid extract is filtered through cheesecloth and the extraction process is repeated on the remaining pulp. The combined liquid extract is concentrated by evaporative drying and freeze-dried to form a powder.

Example 21

The following non-limiting example demonstrates a pastille product adapted for use as a substitute for snus using the same general process outlined in Example 17, except the honeybush extract is replaced with a Tobacco Anti-Oxidant (TAO) extract, which comprises antioxidants extracted from tobacco. The TAO extract is used in an amount of about 1.15 dry weight percent. The TAO extract amount can be varied, such as from about 1 to about 5 dry weight percent.

The TAO extract is prepared by extracting chopped green leaves (*Galpao Commun* variety—high in leaf surface chemistry and antioxidants) with methanol and then evaporating the methanol with rotary evaporation. This highly viscous material is stored in plastic 5 gallon buckets at 4° C. until used. This extract is reconstituted in minimal methanol and injected onto a Flash Chromatography system equipped with a C18 reversed phase column. The extract is separated based on polarity with gradient elution. The more polar fraction, that which elutes in the first five minutes with an initial 75/25 MeOH/Water solvent mixture, is captured in reservoirs while the rest of the eluent is discarded. Flavonoid molecules and high ORAC values are associated with the polar fraction of this separation. The collected fraction is then evaporated with a centrifugal rotary evaporator (e.g., Genevac Rocket Evaporator) until all solvent, MeOH and water, is removed. The dried fractions are then incorporated in the formulation as noted herein. Alternatively, the initial dried Galpao extract can be reconstituted and fractions can be separated using centrifugal partition chromatography.

Example 22

The following non-limiting example demonstrates a pastille product adapted for use as a substitute for snus using the same general process outlined in Example 17, except the water is replaced with 6.9 wet weight percent of red wine. Specifically, a French Red 2006 vintage, labeled Reserve Grand Veneur, Cotes du Rhone, is used. Additionally, the amount of honeybush extract is reduced. The red wine, sucralose, glycerin, and honeybush extract are mixed together prior to adding the mixture to the stirring cooker. The final dry weight percentage of honeybush extract in the product is 1.22 percent and the final dry weight percentage for the residual red wine is 0.77 percent.

Example 23

A smokeless tobacco pastille composition suitable for use as a smokeless tobacco product for oral use is provided in the following manner. An aqueous mixture is prepared. First, a hydrated gum is prepared by hydrating a binder material (gum arabic) with water, dearating the mixture, and removing the top foam. The hydrated gum is gently stirred in a stirring cooker and heated at about 82° C. Sugar, corn syrup, aqueous tobacco extract, and glycerin are added to the hydrated gum to give an aqueous mixture. This aqueous mixture is about 32 parts binder material, about 27 parts sugar, about 4 parts corn syrup, about 3 parts tobacco extract, about 2 parts humectant, and 32 parts water.

The aqueous mixture is mixed with a flavorant, salt (NaCl), and a sweetener (sucralose) to form a smokeless tobacco composition. A botanical material (e.g., rooibos, green tea, yerba mate, or honeybush) is added to the composition. The composition is allowed to mix for 15 minutes. The smokeless tobacco composition is about 94 parts aqueous mixture, 0.6 parts flavorant, 1.5 parts salt, 0.03 parts sucralose, and 4 parts botanical material.

The smokeless tobacco composition is heated to about 71° C. and then deposited into a starch mold. The smokeless tobacco composition remains in the starch mold for about 30-40 hours at about 60° C. The smokeless tobacco composition is allowed to cool, removed from the starch mold, and cured at ambient room temperature.

Example 24

A smokeless tobacco composition suitable for use as a meltable smokeless tobacco product for oral use is provided in the following manner. A tobacco material in the form of an aqueous tobacco extract (extract of a tobacco mixture comprising 75% by weight flue-cured tobacco and 25% by weight burley tobacco) is heat-treated in the presence of lysine and spray-dried. Various dry ingredients are provided, which include a filler (isomalt), a salt (sodium chloride), a sweetener (sucralose), a botanical material in the form of an aqueous botanical extract (e.g., rooibos, green tea, yerba mate, or honeybush), and one or more flavorants (e.g., vanillin and mint). All dry ingredients, in powder form, as well the spray-dried tobacco material, are added together and thoroughly mixed in a Hobart mixer with a paddle for about three minutes at about 120 rpm.

A lipid substance having a melting point of about 38° C. to about 42° C. is provided (available as 108-24-B from AarhusKarlshamn USA Inc.). The lipid substance is a non-hydrogenated lauric coating fat containing palm kernel oil and palm oil.

The lipid substance is melted in a mixing vessel using a microwave. The melted lipid is slowly added to the dry blend while stirring. While maintaining heat to the mixing vessel, addition of the entire melted lipid component creates a flowable slurry of smokeless tobacco composition. The slurry is deposited in a mold to achieve about 1 gram weight per piece of smokeless tobacco product. The slurry is allowed to harden by ambient air drying for about 45 minutes, after which the individual pieces of smokeless tobacco product are removed from the mold. The mixture of the smokeless tobacco composition is about 39 parts lipid substance, 55 parts filler, 2 parts tobacco extract, 2 parts botanical extract, 0.5 parts salt, 0.45 parts sweetener, and 1.05 parts flavorant.

Example 25

An extruded smokeless tobacco composition suitable for use as a smokeless tobacco product for oral use is provided in the following manner. A humectant (available as HYSTAR 3375 from Corn Products International), an emulsifier (available as DUR-EM 117 from Loders Croklaan), corn syrup, glycerin and a flavorant are admixed and heated to form a liquid blend.

A tobacco material blend of two types of tobacco material and a botanical material (e.g., rooibos, green tea, yerba mate, or honeybush) having an average particle size of less than about 100 microns is mixed with salt, sucralose, a binder material (gum arabic) and polydextrose powder (available as LITESSE from Danisco A/S) in a Hobart mixing bowl. The liquid blend is added to the Hobart mixing bowl containing the tobacco material blend, binder material, and polydextrose powder, wherein the ingredients are admixed in Hobart mixer (Model N-50) for about 4-5 minutes at about 120 rpm to form a smokeless tobacco composition. The smokeless tobacco composition is passed through a meat grinder on the Hobart mixer to incorporate the liquid ingredients into the dry ingredients. The smokeless tobacco composition is extruded through a grinder apparatus. Upon extrusion, the smokeless tobacco composition is placed in a Hobart mixer to form a powder granulation. The mixture of the smokeless tobacco composition is about 14.6 parts binder material, 31.8 parts combined tobacco material and botanical material, 29.2 parts humectant, 1 part emulsifier, 14.6 parts polydextrose, 3.6 parts corn syrup, 2.2 parts glycerin, 1.9 parts salt, 0.2 parts sucralose, and 0.8 parts flavorant.

The granulated smokeless tobacco composition is transferred to an injection mold and compressed at about 103,500 kPa for 1 minute. The mold is a stainless steel two-piece block that is filled with the smokeless tobacco composition and then compressed via engagement with a hydraulic press unit (Wabach Hydraulic Press, Model 12-102T, Serial 2201). The smokeless tobacco composition is removed from the injection mold after cooling at ambient temperature for about 60 minutes.

Example 26

A smokeless tobacco lozenge composition suitable for use as a smokeless tobacco product for oral use is provided in the following manner. Isomalt and maltitol syrup are mixed in a pot until the isomalt is melted. In a separate vessel, treated tobacco extract, H₂O, NaCl, sucralose, a botanical material (e.g., rooibos, green tea, yerba mate, or honeybush, optionally in the form of an extract), and flavorings are mixed to form a solution.

The isomalt mixture is removed from the heat and allowed to cool. The extract-containing solution is poured into the hot isomalt mixture and folded in, Optionally, milled tobacco and/or milled botanical material is added, either to the isomalt mixture (prior to combining the isomalt mixture with the extract-containing solution, or to the combined mixture).

The resulting combined mixture is poured into molds to form smokeless tobacco products. When the mixture becomes too viscous to pour, the mixture can be heated in a microwave using high heat (e.g., for about 7 seconds). Representative smokeless tobacco product mixtures are set forth below as Mixtures 1-3 shown in Tables 21-24 below.

TABLE 21

First Lozenge Mixture
MIXTURE 1

| Ingredient | Percent by weight |
|---|---|
| Isomalt ST-M | 90.16 |
| Maltitol syrup | 1.00 |
| Ultrafiltered tobacco extract (77% solids) | 2.00 |
| Botanical extract | 2.00 |
| NaCl | 0.70 |
| Sucralose | 0.04 |
| H₂O | 4.00 |
| Flavorant | 0.10 |

TABLE 22

Second Lozenge Mixture
MIXTURE 2

| Ingredient | Percent by weight |
|---|---|
| Isomalt ST-M | 87.55 |
| Maltitol syrup | 0.95 |
| Ultrafiltered tobacco extract (77% solids) | 1.9 |
| NaCl | 0.66 |
| Sucralose | 0.04 |
| H₂O | 3.8 |
| Flavorant | 0.10 |
| Milled botanical material | 5.0 |

TABLE 23

Third Lozenge Mixture
MIXTURE 3

| Ingredient | Percent by weight |
|---|---|
| Isomalt ST-M | 90.55 |
| Maltitol syrup | 0.99 |
| Ultrafiltered tobacco extract (77% solids) | 0.69 |
| Botanical extract | 0.69 |
| NaCl | 3.96 |
| Sucralose | 0.04 |
| H₂O | 3.96 |
| Flavorant | 0.10 |
| Milled botanical material | 1.0 |

Example 27

A smokeless tobacco lozenge composition suitable for use as a two-component smokeless tobacco product for oral use is provided in the following manner.

A: Preparation of Amber Colored Core Component

Isomalt, maltitol syrup, and vanillin are combined to form a slurry. Separately, NaCl is mixed with water, and the resulting NaCl solution is added to the slurry in a cooking vessel. The temperature of the isomalt mixture in the cooking vessel is brought to 350° F. (about 177° C.). In a separate vessel, nicotine solution, botanical extract (e.g., rooibos, green tea, yerba mate, or honeybush), vanillin, sucralose, citric acid, sucralose, additional flavoring(s) and colorant(s) are mixed.

The isomalt mixture is allowed to cool to 300° F. (about 149° C.). The nicotine solution-containing mixture is added to the hot isomalt mixture and stirred for about 20 seconds or until well-blended. The resulting mixture is removed from the heat and transferred to a depositor. A representative amber colored core component mixture is set forth below in Table 24.

TABLE 24

Colored Component Mixture
COLORED CORE COMPONENT MIXTURE

| Ingredient | Percent by weight |
|---|---|
| Isomalt ST-M | 93.74 |
| Maltitol syrup | 1.00 |
| Tobacco extract* | 1.40 |
| Botanical extract | 1.40 |
| NaCl | 1.40 |
| Vanillin | 0.05 |
| Sucralose | 0.01 |
| Citric acid | 0.05 |
| H₂O | 5.00 |
| Flavorant | 0.05 |
| Colorant | 0.90 |

*The tobacco extract is in the form of a nicotine solution comprising 7.5% nicotine and 93.5% water.

B: Preparation of Uncolored Outer Component

Isomalt, maltitol syrup, and vanillin are combined to form a slurry. Separately, NaCl is mixed with water, and the resulting NaCl solution is added to the slurry in a cooking vessel. The temperature of the isomalt mixture in the cooking vessel is brought to 350° F. (about 177° C.). In a separate vessel, nicotine solution, botanical extract (e.g., rooibos, green tea, yerba mate, or honeybush), vanillin, sucralose, citric acid, sucralose, and additional flavoring(s) are mixed.

The isomalt mixture is allowed to cool to 300° F. (about 149° C.). The nicotine and botanical solution-containing mixture is added to the hot isomalt mixture and stirred for about 20 seconds or until well-blended. The resulting mixture is removed from the heat and transferred to a depositor. A representative uncolored outer component mixture is set forth below.

TABLE 25

Uncolored Component Mixture
UNCOLORED OUTER COMPONENT MIXTURE

| Ingredient | Percent by weight |
|---|---|
| Isomalt ST-M | 94.64 |
| Maltitol syrup | 1.00 |
| Tobacco extract* | 1.40 |

TABLE 25-continued

Uncolored Component Mixture
UNCOLORED OUTER COMPONENT MIXTURE

| Ingredient | Percent by weight |
|---|---|
| Botanical extract | 1.40 |
| NaCl | 1.40 |
| Vanillin | 0.05 |
| Sucralose | 0.01 |
| Citric acid | 0.05 |
| $H_2O$ | 5.00 |
| Flavorant | 0.05 |

*The tobacco extract is in the form of a nicotine solution comprising 7.5% nicotine and 93.5% water.

C: Construction of Smokeless Tobacco Product

The isomalt mixtures described in Sections A and B are dispensed from the depositor as follows, at a temperature that allows the mixtures to maintain some degree of flowability. From the depositor, the colored core component mixture is deposited into the molds first, followed by the uncolored outer component mixture. Either a one-pass or two-pass system can be used. In a one-pass system, both components are dispensed into a single mold before dispensing into additional molds. The colored core component mixture is deposited into the mold first, followed immediately by the uncolored outer component mixture. In a two-pass system, a depositor containing the colored core component mixture first deposits the colored mixture into a series of molds; subsequently, a depositor containing the uncolored outer component mixture deposits the uncolored mixture into the molds to form the products. The smokeless tobacco products are allowed to cool and set and then dispensed from the molds. Such smokeless tobacco products are characterized by an amber-colored "dot" exposed on the surface of the product.

Example 28

The following non-limiting example demonstrates the potential increase in the ORAC value and in the level of specific antioxidant compounds in a pastille-type product upon the addition of a small proportion of green tea. Control pastilles are made using a carbohydrate base gum material that also contains fire-cured cut filler tobacco and a fire-cured tobacco spray dried extract. Sucralose and salt are also added for the modification of taste. A pastille with the same composition as the control, but having no fire-cured cut filler tobacco and containing approximately 15% by dry weight of green tea, is also made.

The ORAC values for each sample are measured using the same procedures described in Example 1 above. The ORAC values for the samples are given in Table 26 below. The ORAC index is expressed in TEs (trolex equivalent μmol/g botanical).

TABLE 26

ORAC values for pastille samples

| Pastille | ORAC average (μM TE)/g botanical | Standard Deviation (μM TE) |
|---|---|---|
| Control | 16.9 | 3.1 |
| Pastille with 15% green tea | 84.2 | 5.3 |

As seen in Table 26, the addition of 15% green tea to the pastille produces a product with an ORAC value about five times higher than the ORAC value of the control product without the green tea.

The GC/MS scanning technique described in Example 1 is used for the evaluation of the relative level of several antioxidant compounds in the two samples. The evaluation is done based on the normalized area counts of the peaks generated by the main antioxidant compounds in the chromatographic scans applied on each material. The normalization is performed using the area of an internal standard (400 ppm of tertbutylhydroquinone). The results show that the addition of green tea in alternative tobacco products adds known antioxidant compounds to the product. Specifically, the addition of green tea added compounds such as epigallocatechin, epicatechin gallate, and epigallocatechin gallate to the product. These compounds are known for their antioxidant character as well as for the potential benefit in the treatment of many health disorders including cancer.

Example 29

The following non-limiting example demonstrates the potential increase in the ORAC value and in the level of specific antioxidant compounds in a pastille-type product upon the addition of a small proportion of dry rosemary. Control pastilles are made using a carbohydrate base gum material that also contains fire cured cut filler tobacco and a fire cured tobacco spray dried extract. Sucralose and salt are also added for the modification of taste. A pastille with the same composition as the control, but having no fire cured cut filler tobacco and containing approximately 3% or about 5.9% by dry weight of rosemary, is also made.

The ORAC values for each sample are measured using the same procedures described in Example 1 above. The ORAC values for the samples are given in Table 27 below. The ORAC index is expressed in TEs (trolex equivalent μmol/g botanical).

TABLE 27

ORAC values for pastille samples

| Pastille | ORAC average (μM TE)/g botanical | Standard Deviation (μM TE) |
|---|---|---|
| Control | 16.9 | 3.1 |
| Pastille with 3% rosemary | 20.5 | 4.9 |
| Pastille with 5.9% rosemary | 36.6 | 3.5 |

As seen in Table 27, the addition of rosemary causes a small increase in the ORAC values for the product. The antioxidant compounds associated with rosemary include rosmarinic acid, carnosic acid, betulinic acid, oleanolic acid, and ursolic acid, and other compounds at lower levels. These compounds are known for their antioxidant character and also for their potential benefit in the treatment of health disorders such as cancer.

The products are also evaluated to measure the increase in the content of the antioxidant compounds from the dry rosemary. The GC/MS scanning technique described in Example 1 is used for the evaluation of the relative level of several antioxidant compounds in the three samples. The evaluation is done based on the normalized area counts of the peaks generated by the main antioxidant compounds in the chromatographic scans applied on each material. The normalization is performed using the area of an internal standard (400 ppm of tertbutylhydroquinone). The results show that the addition of botanicals in tobacco products adds known antioxidant compounds to the product. Specifically, the addition of rosemary added compounds such as rosmarinic acid, carnosic acid, betulinic acid, oleanolic acid, and ursolic acid to the pastille products incorporating dried rosemary.

Example 30

The following non-limiting example demonstrates the potential increase in the ORAC and FRAP values and in the level of specific antioxidant compounds in a pastille product upon the addition of freeze dried extract of certain botanical materials. Pastille products are made using a carbohydrate base gum material, some sweeteners including a small amount of sucralose, salt (NaCl), and tobacco-derived nicotine. A specific level of botanical extract is also added.

The botanical extracts are obtained from green tea (*Camellia sinensis*), guayusa (*Ilex guayusa*), red rooibos and green rooibos (*Aspalathus linearis*), and from honeybush (*Cyclopia*). For the preparation of the extract, leaf material is extracted with water in the ratio 1/10 leaf/water for 10 minutes at 82° C. The resulting liquid is subject to diafiltration that eliminated the fraction with MW higher than 50 k. The resulting liquid is freeze dried and added to the pastille base material as indicated in Table 28.

TABLE 28

Addition of freeze dried extract of functional botanical to pastille

| Botanical extract added | % in pastille at 12% moisture |
|---|---|
| Green tea | 3.03% |
| Guayusa | 3.01% |
| Red (fermented) rooibos | 3.88% |
| Green rooibos | 3.88% |
| Honeybush | 3.88% |

The ORAC values for each sample are measured using the same procedures described in Example 1 above. The ORAC values for the samples are given in Tables 29 and 30 below. The ORAC index is expressed in TEs (trolex equivalent µmol/g botanical).

TABLE 29

ORAC (hydrophilic) values (µM TE)/g for pastille samples

| Pastille | ORAC average (µM TE)/g | SD (µM TE)/g | RSD % |
|---|---|---|---|
| Green tea | 95.2 | 8.5 | 8.9 |
| Guayusa | 66.9 | 3.8 | 5.7 |
| Red (fermented) rooibos | 135.5 | 4.3 | 3.2 |
| Green rooibos | 169.9 | 6.9 | 4.1 |
| Honeybush | 35.6 | 1.4 | 3.9 |

TABLE 30

ORAC (lipophilic) values (µM TE)/g for pastille samples

| Pastille | ORAC average (µM TE)/g | SD (µM TE)/g | RSD % |
|---|---|---|---|
| Green tea | 117.9 | 5.2 | 4.4 |
| Guayusa | 56.9 | 1.2 | 2.1 |
| Red (fermented) rooibos | 140.6 | 5.1 | 3.6 |
| Green rooibos | 203.4 | 2.5 | 1.2 |
| Honeybush | 60.8 | 1.7 | 2.7 |

The FRAP index values for each sample are measured using the same procedures described in Example 1 above. The FRAP index values for the samples are indicated in Table 31 below. The FRAP index is expressed in µmol $Fe^{2+}$/g botanical.

TABLE 31

FRAP values (µM $Fe^{2+}$)/g for pastille samples

| Pastille | FRAP average (µM $Fe^{2+}$)/g | SD (µM $Fe^{2+}$)/g | RSD % |
|---|---|---|---|
| Green tea | 154.0 | 2.5 | 1.6 |
| Guayusa | 66.0 | 2.2 | 3.4 |
| Red (fermented) rooibos | 145.6 | 1.8 | 1.2 |
| Green rooibos | 231.6 | 7.7 | 3.3 |
| Honeybush | 69.4 | 2.9 | 4.1 |

The ORAC and FRAP values for a pastille without the addition of a botanical extract is very low (1.3 for hydrophilic ORAC, 1.5 for lipophilic ORAC, and 8.3 for FRAP). As shown in Tables 29, 30 and 31, the addition of even low levels of a botanical extract (3-4%) from different functional botanicals leads to a considerable increase in the ORAC and FRAP indexes of the pastille. For example, with the addition of green rooibos, the ORAC and FRAP values are increased for the pastilles from about 1.5 for ORAC and 8.3 for FRAP for the pastille with no extract addition up to about 200 for lipophilic ORAC, up to about 170 for hydrophilic ORAC, and up to about 231 for FRAP. The addition of other extracts also increases the antioxidant indices, but at slightly lower levels. This increase indicates that some antioxidant character is imparted to the pastille by the extract addition. A higher increase can be achieved by increasing the level of extract addition.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A smokeless tobacco product configured for insertion into the mouth of a user of the product, the smokeless tobacco product comprising a dissolvable or meltable base composition admixed with a tobacco material and a botanical material, wherein the botanical material is present in an amount of at least about 5.0% of the total dry weight of the smokeless tobacco product and the tobacco material is present in an amount of at least about 0.2% of the total dry weight of the smokeless tobacco product, wherein the botanical material is a tea or a tisane material in the form of shredded or particulate plant material, and wherein the tobacco material is in the form of an extract;

wherein the botanical material is selected from the group consisting of hibiscus, rose hip, yerba mate, guayusa, yerba santa, bacopa monniera, ginkgo biloba, withania somnifera, and combinations thereof;

wherein the botanical material has an ORAC index value of at least about 250 (µmol TE)/g or a FRAP index value of at least about 250 (µmol/$Fe^{2+}$)/g and wherein the smokeless tobacco product has an ORAC index value of at least about 20 (µmol TE)/g or a FRAP index value of at least about 50 (µmol/Fe$^{2+}$)/g;

wherein the dissolvable or meltable base composition comprises at least about 25 dry weight percent of a sugar alcohol, and at least about 25 dry weight percent of a natural gum binder component;

wherein at least a portion of the botanical material is provided in the form of a residual of an evaporated botanical juice; and wherein the botanical juice is fermented.

2. The smokeless tobacco product of claim 1, wherein the botanical material has an ORAC index value of about 500 (µmol TE)/g or greater.

3. The smokeless tobacco product of claim 1, wherein the botanical material has an ORAC index value of about 1000 (µmol TE)/g or greater.

4. The smokeless tobacco product of claim 1, wherein the botanical material has a FRAP index value of about 500 (µmol/Fe$^{2+}$)/g or greater.

5. The smokeless tobacco product of claim 1, wherein the botanical material has a FRAP index value of about 1000 (µmol/Fe$^{2+}$)/g or greater.

6. The smokeless tobacco product of claim 1, wherein the smokeless tobacco product has an ORAC index value of at least about 50 (µmol TE)/g or a FRAP index value of at least about 80 (µmol/Fe$^{2+}$)/g.

7. The smokeless tobacco product of claim 1, wherein the botanical material further includes a material selected from the group consisting of honeybush, green tea, black tea, rooibos, and combinations thereof.

8. The smokeless tobacco product of claim 1, further comprising one or more additional components selected from the group consisting of flavorants, fillers, binders, pH adjusters, buffering agents, salts, sweeteners, colorants, disintegration aids, humectants, and preservatives.

9. The smokeless tobacco product of claim 1, wherein the sugar alcohol of the base composition comprises isomalt, and the base composition further comprises maltitol.

10. The smokeless tobacco product of claim 1, wherein the base composition is a meltable formulation comprising a lipid having a melting point of about 36° C. to about 45° C.

11. The smokeless tobacco product of claim 10, wherein the base composition comprises the lipid in an amount of about 30% by weight or greater, and a filler in an amount of about 30% by weight or greater.

12. The smokeless tobacco product of claim 11, wherein the filler is a sugar alcohol.

13. The smokeless tobacco product of claim 12, wherein the sugar alcohol is isomalt.

14. The smokeless tobacco product of claim 1, wherein the smokeless tobacco product further comprises a polysaccharide filler.

15. The smokeless tobacco product of claim 14, wherein the polysaccharide filler comprises polydextrose.

16. The smokeless tobacco product of claim 14, wherein the smokeless tobacco product is a pastille, and wherein the polysaccharide filler component of the pastille is present in an amount of from about 10 weight percent to about 25 weight percent of the smokeless tobacco product on a dry weight basis.

17. The smokeless tobacco product of claim 1, wherein the smokeless tobacco product is a pastille, and wherein the pastille comprises isomalt in combination with gum arabic.

18. A smokeless tobacco product configured for insertion into the mouth of a user of the product, the smokeless tobacco product comprising a dissolvable or meltable base composition admixed with a tobacco material and a botanical material, wherein the botanical material is present in an amount of at least about 0.1% of the total dry weight of the smokeless tobacco product;

wherein at least a portion of the botanical material is provided in the form of a residual of an evaporated botanical juice;

wherein the botanical juice is fermented;

wherein the botanical material is selected from the group consisting of hibiscus, rose hip, yerba mate, guayusa, yerba santa, bacopa monniera, ginkgo biloba, withania somnifera, and combinations thereof; and wherein the dissolvable or meltable base composition comprises at least about 25 dry weight percent of a sugar alcohol, and at least about 25 dry weight percent of a natural gum binder component.

19. A smokeless tobacco product configured for insertion into the mouth of a user of the product, the smokeless tobacco product comprising a dissolvable or meltable base composition admixed with a tobacco material and a botanical material, wherein the botanical material is present in an amount of at least about 0.1% of the total dry weight of the smokeless tobacco product;

wherein the base composition is a dissolvable lozenge formulation comprising a sugar alcohol in an amount of at least about 80% by weight;

wherein the sugar alcohol comprises isomalt;

wherein the botanical material is selected from the group consisting of hibiscus, rose hip, yerba mate, guayusa, yerba santa, bacopa monniera, ginkgo biloba, withania somnifera, and combinations thereof;

wherein at least a portion of the botanical material is provided in the form of a residual of an evaporated botanical juice; and wherein the botanical juice is fermented.

20. A smokeless tobacco product configured for insertion into the mouth of a user of the product, the smokeless tobacco product comprising a dissolvable or meltable base composition admixed with a tobacco material and a botanical material, wherein the botanical material is present in an amount of at least about 0.1% of the total dry weight of the smokeless tobacco product, wherein the botanical material comprises a material selected from the group consisting of hibiscus, rose hip, yerba mate, guayusa, yerba santa, bacopa monniera, ginkgo biloba, withania somnifera, and combinations thereof;

wherein at least a portion of the botanical material is provided in the form of a residual of an evaporated botanical juice; and wherein the botanical juice is fermented.

* * * * *